US011625027B2

United States Patent
Mizuno

(10) Patent No.: US 11,625,027 B2
(45) Date of Patent: Apr. 11, 2023

(54) MONITORING SYSTEM, MONITORING METHOD, AND STORAGE MEDIUM

(71) Applicant: Mitsubishi Electric Corporation, Tokyo (JP)

(72) Inventor: Takayuki Mizuno, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 17/789,223

(22) PCT Filed: Feb. 25, 2020

(86) PCT No.: PCT/JP2020/007515
§ 371 (c)(1),
(2) Date: Jun. 27, 2022

(87) PCT Pub. No.: WO2021/171377
PCT Pub. Date: Sep. 2, 2021

(65) Prior Publication Data
US 2023/0051197 A1    Feb. 16, 2023

(51) Int. Cl.
*G05B 19/418*    (2006.01)
(52) U.S. Cl.
CPC ........... *G05B 19/41865* (2013.01); *G05B 2219/31449* (2013.01)
(58) Field of Classification Search
None
See application file for complete search history.

(56) References Cited

U.S. PATENT DOCUMENTS

| | | | |
|---|---|---|---|
| 2007/0079355 A1* | 4/2007 | Chand | G05B 19/054 726/2 |
| 2015/0316922 A1* | 11/2015 | Rischar | G05B 19/41855 700/23 |
| 2017/0300041 A1 | 10/2017 | Onishi et al. | |

FOREIGN PATENT DOCUMENTS

| | | |
|---|---|---|
| JP | 2-214926 A | 8/1990 |
| JP | 4-96091 A | 3/1992 |

(Continued)

OTHER PUBLICATIONS

International Search Report and Written Opinion dated May 19, 2020, received for PCT Application PCT/JP2020/007515, filed on Feb. 25, 2020, 8 pages including English Translation.

(Continued)

*Primary Examiner* — Sean Shechtman
(74) *Attorney, Agent, or Firm* — Xsensus LLP

(57) ABSTRACT

A plurality of hierarchy information management devices include a first hierarchy information management unit managing first hierarchy information in which information on instruments is represented in a hierarchy structure, and each hierarchy information management device manages the first hierarchy information of a different one of the instruments. A monitoring device includes: a second hierarchy information management unit generating second hierarchy information based on a plurality of different pieces of the first hierarchy information acquired from the hierarchy information management devices, the second hierarchy information being hierarchy information in which the first hierarchy information is connected in a hierarchy structure; a display unit displaying information; and a display processing unit performing a process of switching between a plurality of different monitoring screens for display on the display unit, the different monitoring screens corresponding to different (Continued)

layers in the second hierarchy information and showing the operating state of the monitoring targets.

16 Claims, 23 Drawing Sheets

(56) References Cited

FOREIGN PATENT DOCUMENTS

| | | |
|---|---|---|
| JP | 6-236169 A | 8/1994 |
| JP | 2017-191567 A | 10/2017 |
| JP | 2018-25998 A | 2/2018 |

OTHER PUBLICATIONS

Notice of Reasons for Refusal dated Nov. 10, 2020, received for JP Application 2020-539297, 4 pages including English Translation.
Decision to Grant dated Mar. 16, 2021, received for JP Application 2020-539297, 4 pages including English Translation.

\* cited by examiner

FIG.3
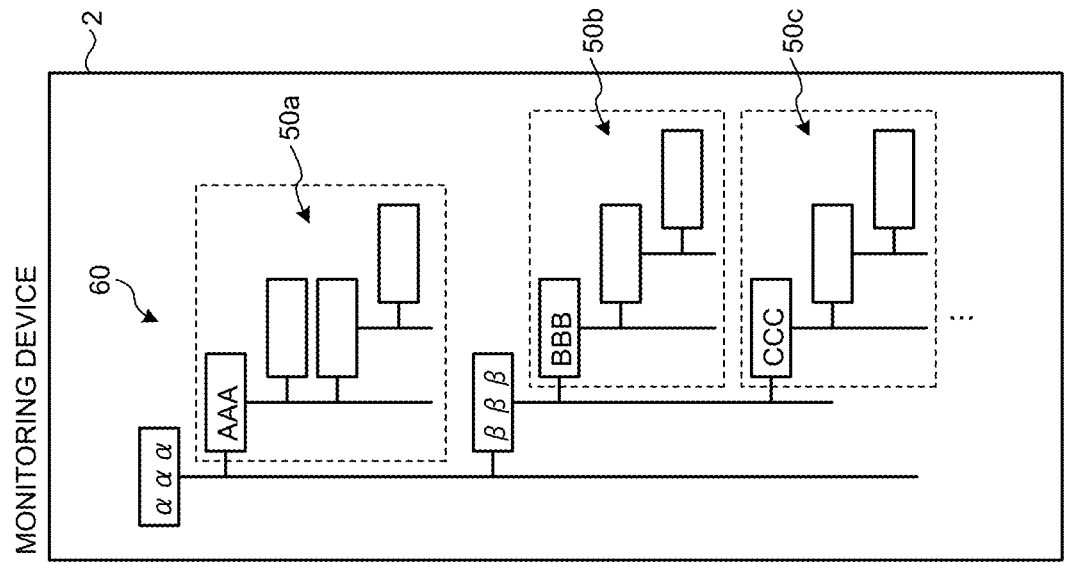
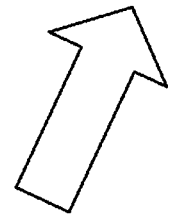
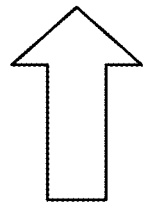
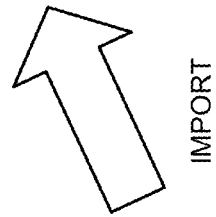

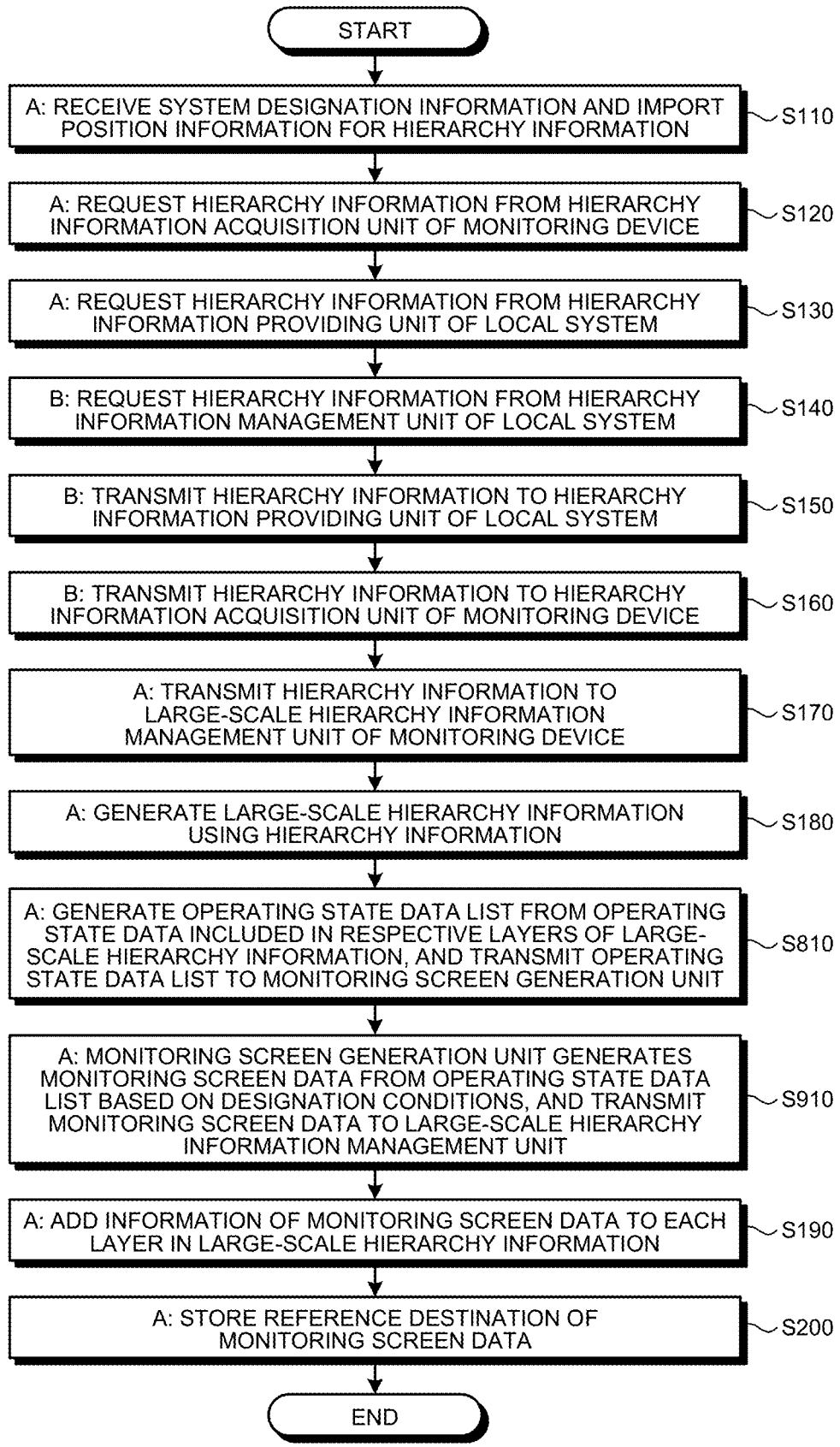

MONITORING SYSTEM, MONITORING METHOD, AND STORAGE MEDIUM

CROSS-REFERENCE TO RELATED APPLICATION

The present application is based on PCT filing PCT/JP2020/007515, filed Feb. 25, 2020, the entire contents of which are incorporated herein by reference.

FIELD

The present invention relates to a monitoring system, a monitoring method, and a storage medium capable of collecting information from a plurality of factories and a plurality of social infrastructure facilities and monitoring the plurality of factories and the plurality of social infrastructure facilities.

BACKGROUND

In recent years, there has been an increasing demand for constructing a large-scale monitoring system capable of collecting and monitoring information from a plurality of factories and a plurality of social infrastructure facilities which are a plurality of monitoring targets in order to collectively monitor large-scale factories and social infrastructure facilities across a plurality of buildings, and/or to remotely monitor factories and social infrastructure facilities located around the world.

Patent Literature 1 discloses a screen display device designed to monitor a large-scale plant. Specifically, the screen display device enables a plurality of screens to be selected in a hierarchy structure so as to quickly switch to and display a necessary screen with as few operations as possible in the system having a large number of screens.

CITATION LIST

Patent Literature

Patent Literature 1: Japanese Patent Application Laid-open No. H2-214926

SUMMARY

Technical Problem

However, in the technique of Patent Literature 1, the larger the scale of the system, the larger the hierarchy structure and the more man-hours and load required of the worker in creating the hierarchy structure. However, the technique of Patent Literature 1 cannot cope with this problem.

The present invention has been made in view of the above, and an object thereof is to obtain a monitoring system which can monitor a plurality of monitoring targets by displaying information collected from the plurality of monitoring targets, and which is easily constructed.

Solution to Problem

In order to solve the above-described problems and achieve the object, a monitoring system according to the present invention includes a plurality of hierarchy information management devices and a monitoring device, and monitors an operating state of a plurality of instruments that are monitoring targets. The plurality of hierarchy information management devices include a first hierarchy information management unit that manages first hierarchy information that is information in which information on the instruments is represented in a hierarchy structure, and each of the plurality of hierarchy information management devices manages the first hierarchy information of a different one of the instruments. The monitoring device includes: a second hierarchy information management unit that generates second hierarchy information based on a plurality of different pieces of the first hierarchy information acquired from the plurality of hierarchy information management devices, the second hierarchy information being hierarchy information in which the first hierarchy information is connected in a hierarchy structure; a display unit that displays information; and a display processing unit that performs a process of switching between a plurality of different monitoring screens for display on the display unit, the plurality of different monitoring screens corresponding to different layers in the second hierarchy information and showing the operating state of the monitoring targets.

Advantageous Effects of Invention

The monitoring system according to the present invention can achieve the effect of monitoring a plurality of monitoring targets by displaying information collected from the plurality of monitoring targets, and being easily constructed.

BRIEF DESCRIPTION OF DRAWINGS

FIG. 3 is a diagram schematically illustrating a method for generating large-scale hierarchy information in the monitoring system according to the first embodiment.

FIG. 24 is a flowchart illustrating a procedure of a method for generating large-scale hierarchy information in a monitoring system according to an eighth embodiment.

DESCRIPTION OF EMBODIMENTS

Hereinafter, a monitoring system, a monitoring method, and a storage medium according to embodiments of the present invention will be described in detail with reference to the drawings. The present invention is not limited to the embodiments.

First Embodiment

Figure 1:
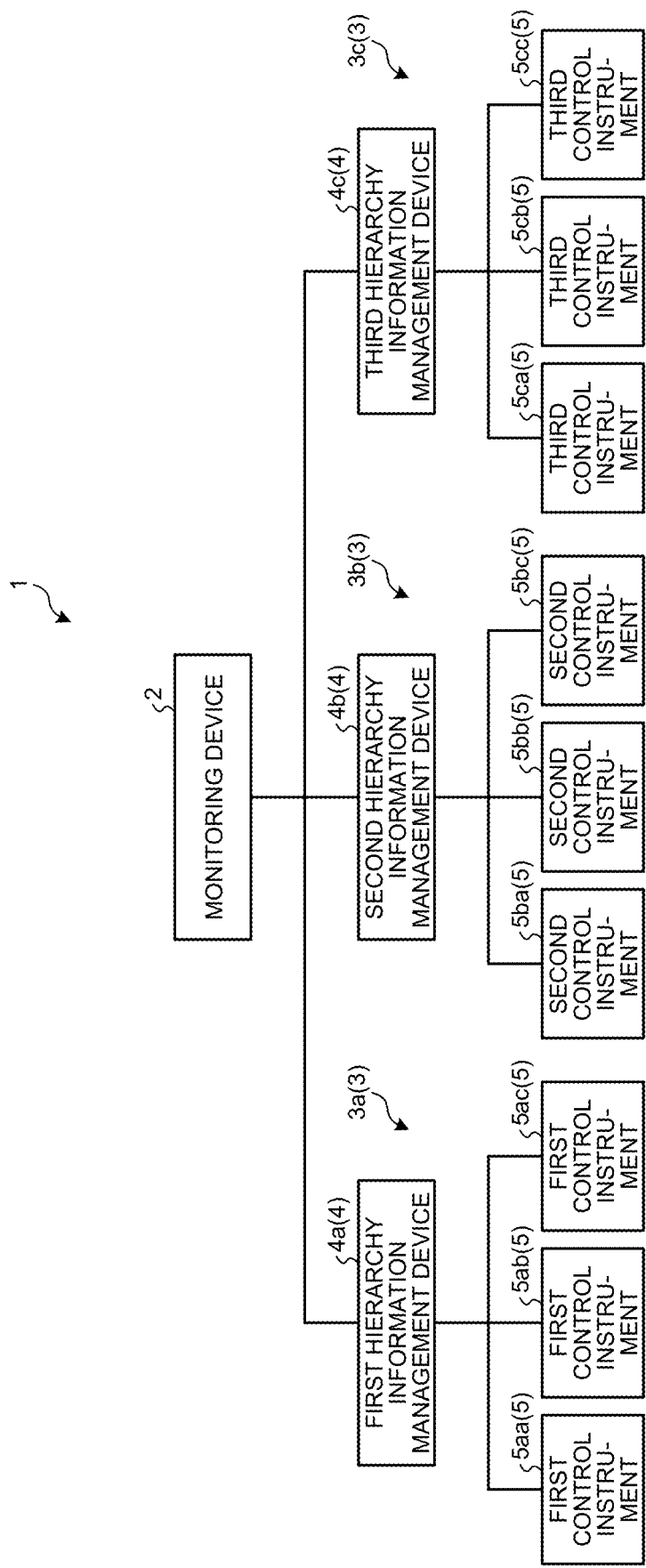
FIG. 1 is a diagram illustrating a configuration of a monitoring system according to a first embodiment of the present invention.

FIG. 1 is a diagram illustrating a configuration of a monitoring system according to a first embodiment of the present invention. A monitoring system 1 according to the first embodiment is a monitoring system capable of acquiring hierarchy information provided in a plurality of local systems and switching between monitoring screens that show operating state data related to the acquired hierarchy information for display.

As illustrated in FIG. 1, the monitoring system 1 according to the first embodiment of the present invention includes a monitoring device 2 and a local system 3. The local system 3 includes a hierarchy information management device 4 and a control instrument 5.

FIG. 1 depicts a first local system 3a, a second local system 3b, and a third local system 3c as the local systems 3. Hereinafter, the first local system 3a, the second local system 3b, and the third local system 3c may be collectively referred to as the local system(s) 3 when no distinction is made between them.

The first local system 3a includes a first hierarchy information management device 4a, a first control instrument 5aa, a first control instrument 5ab, and a first control instrument 5ac. The second local system 3b includes a second hierarchy information management device 4b, a second control instrument 5ba, a second control instrument 5bb, and a second control instrument 5bc. The third local system 3c includes a third hierarchy information management device 4c, a third control instrument 5ca, a third control instrument 5cb, and a third control instrument 5cc.

Hereinafter, the first hierarchy information management device 4a, the second hierarchy information management device 4b, and the third hierarchy information management device 4c may be collectively referred to as the hierarchy information management device(s) 4 when no distinction is made between them. In addition, the first control instrument 5aa, the first control instrument 5ab, and the first control instrument 5ac may be collectively referred to as the first control instrument(s) 5a when no distinction is made between them. In addition, the second control instrument 5ba, the second control instrument 5bb, and the second control instrument 5bc may be collectively referred to as the second control instrument(s) 5b when no distinction is made between them. In addition, the third control instrument 5ca, the third control instrument 5cb, and the third control instrument 5cc may be collectively referred to as the third control instrument(s) 5c when no distinction is made between them. In addition, the first control instrument 5a, the second control instrument 5b, and the third control instrument 5c may be collectively referred to as the control instrument(s) 5 when no distinction is made between them.

The control instrument 5 is an instrument that controls an instrument to be controlled (not illustrated). A given number of instruments to be controlled (not illustrated) are connected to the control instrument 5. The instruments to be controlled are instruments such as production devices or facility devices. The control instrument 5 can communicate with the instruments to be controlled. That is, the control instrument 5 is a controller, e.g. a programmable logic controller (PLC), that controls instruments (not illustrated) such as production devices or facility devices. The control instrument 5 controls one or more instruments that are instruments to be controlled. The control instrument 5 may be, for example, a controller other than the PLC, or may be a numerical control device. Examples of production devices or facility devices include buildings, facilities, devices, and instruments.

The control instrument 5 holds various types of information on the instrument to be controlled. Various types of information on the instrument to be controlled are exemplified by operating state data, i.e. information for use in the control of the instrument to be controlled and information generated during the control of the target. Operating state data can be rephrased as data indicating the control state of the target controlled by the control instrument 5. The control instrument 5 transmits various types of information on the target to the hierarchy information management device 4.

In order to manage and monitor the operating state of production devices or facility devices, the hierarchy information management device 4 acquires various types of information on the production devices or facility devices and displays the information. That is, the production devices and facility devices are monitoring targets for the hierarchy information management device 4. Information on the production devices or facility devices is stored in the hierarchy information management device 4 as hierarchy information created by the user in a hierarchy structure. That is, in the first embodiment, hierarchy information 50 is information in which various types of information on production devices and/or facility devices that are monitoring targets are represented in a hierarchy structure. The hierarchy information is first hierarchy information in the monitoring system 1.

Various types of information on production devices or facility devices represented by hierarchy information include operating state data. Operating state data is data indicating the operating state of production devices or facility devices, and is updated in real time. In the monitoring system 1, operating state data is used for displaying the operating state of monitoring targets on monitoring screens.

Figure 2:
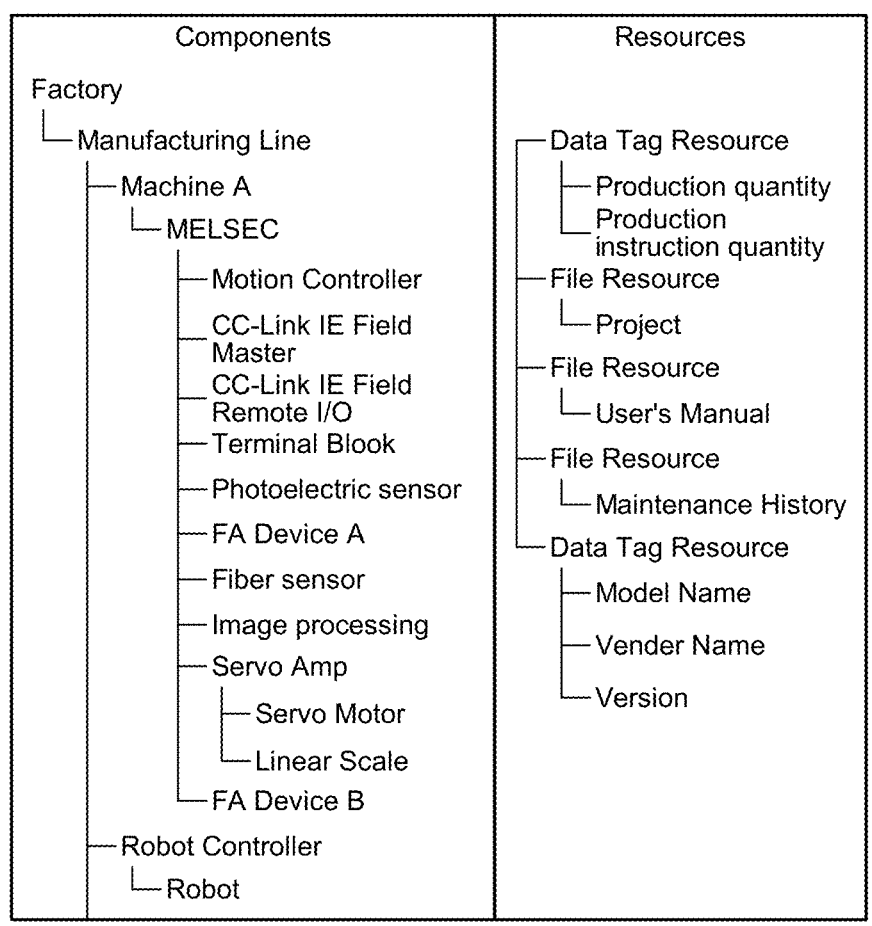
FIG. 2 is a diagram illustrating an example of hierarchy information in the monitoring system according to the first embodiment.

FIG. 2 is a diagram illustrating an example of hierarchy information in the monitoring system according to the first embodiment. In the example illustrated in FIG. 2, as hierarchy information of "Components" indicating physical elements of monitoring targets, the layer "Factory" is placed at the highest level. The layer "Manufacturing Line" is placed one level below the layer "Factory". The layer "Machine A" and the layer "Robot Controller" are placed one level below the layer "Manufacturing Line". The layer "MELSEC" is placed one level below the layer "Machine A". A plurality of elements including the layer "Motion Controller" are placed one level below the layer "MELSEC". The layer "Robot" is placed one level below the layer "Robot Controller".

In the example illustrated in FIG. 2, as hierarchy information of "Resource" indicating information included in the layer "MELSEC", the layer "Data Tag Resource", three layers of "File Resource", and the layer "Data Tag Resource" are placed at the highest level. Other elements of information are similarly placed in a hierarchy structure. Note that a node indicates a branch layer. A layer path indicates the position of the layer.

FIG. 3 is a diagram schematically illustrating a method for generating large-scale hierarchy information in the monitoring system according to the first embodiment. FIG. 3 illustrates a case where the monitoring device 2 imports hierarchy information from the first local system 3*a*, the second local system 3*b*, and the third local system 3*c*.

As illustrated in FIG. 3, in the first local system 3*a*, hierarchy information 50*a* having a layer AAA as the uppermost layer is stored in a memory. In the second local system 3*b*, hierarchy information 50*b* having a layer BBB as the uppermost layer is stored in a memory. In the third local system 3*c*, hierarchy information 50*c* having a layer CCC as the uppermost layer is stored in a memory.

The monitoring device 2 acquires the hierarchy information 50*a* from the first local system 3*a*, acquires the hierarchy information 50*b* from the second local system 3*b*, acquires the hierarchy information 50*c* from the third local system 3*c*, and generates large-scale hierarchy information 60 having a layer ααα as the uppermost layer. In the example illustrated in FIG. 3, the monitoring device 2 places the hierarchy information 50*a* and a layer βββ at the level immediately below the layer ααα. The monitoring device 2 places the hierarchy information 50*b* and the hierarchy information 50*c* at the level immediately below the layer βββ. Consequently, the large-scale hierarchy information 60 is generated including the hierarchy information 50*a*, the hierarchy information 50*b*, and the hierarchy information 50*c* connected in a hierarchy structure.

Figure 4:
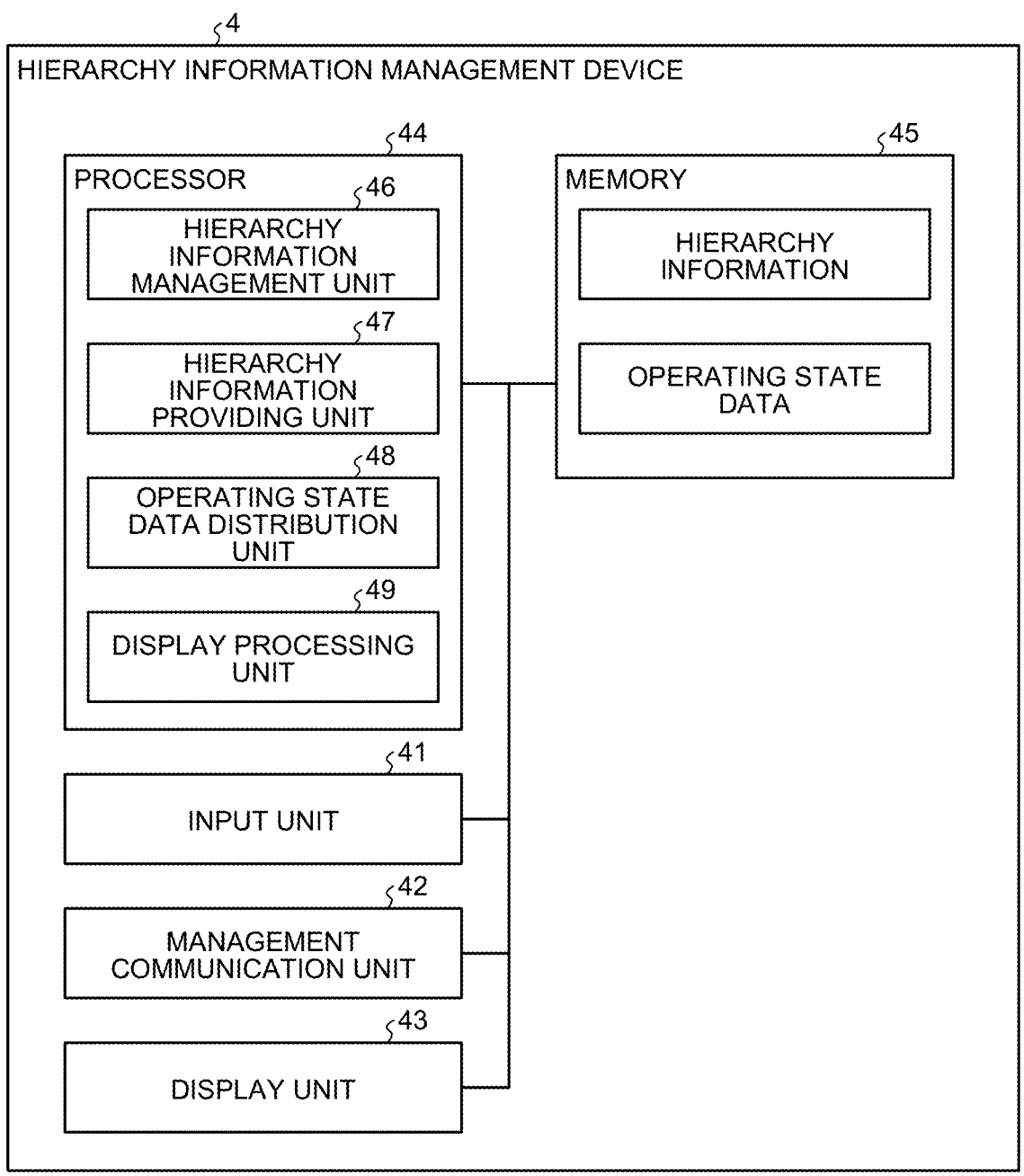
FIG. 4 is a diagram illustrating a functional configuration of a hierarchy information management device of the monitoring system according to the first embodiment.

FIG. 4 is a diagram illustrating a functional configuration of the hierarchy information management device of the monitoring system according to the first embodiment. The hierarchy information management device 4 includes an input unit 41 to which information is input, a management communication unit 42 that communicates with the control instrument 5 and with the monitoring device 2, a display unit 43 that displays information, a processor 44 that executes various processes, and a memory 45 that stores information.

The input unit 41 is a device such as a keyboard, a mouse, or a touch panel. Information is input to the input unit 41 through an operator's operation. The management communication unit 42 is an interface for connection with a device outside the hierarchy information management device 4. The management communication unit 42 can transmit hierarchy information and operating state data to the monitoring device 2 by means of, for example, file output using a setting information file, network communication using a communication protocol, or the like. The management communication unit 42 receives the data transmitted by the control instrument 5 and the information transmitted by the monitoring device 2. The display unit 43 displays information on a screen.

The processor 44 is a central processing unit (CPU). The processor 44 may be a processing device, a computing device, a microprocessor, a microcomputer, or a digital signal processor (DSP). The memory 45 includes a random access memory (RAM), a read only memory (ROM), a flash memory, an erasable programmable read only memory (EPROM) or an electrically erasable programmable read only memory (EEPROM, registered trademark), a hard disk drive (HDD), or a solid state drive (SSD). The processing program of the hierarchy information management device 4 is stored in the memory 45. The processor 44 executes a program stored in the memory 45.

FIG. 4 depicts a functional configuration of the hierarchy information management device 4 implemented by using the processor 44. A hierarchy information management unit 46 manages the hierarchy information of the local system 3 created by the user, and adds, edits, and deletes hierarchy information. The hierarchy information management unit 46 also acquires operating state data from the control instrument 5 via the management communication unit 42. The hierarchy information management unit 46 is a first hierarchy information management unit in the monitoring system 1.

For providing the hierarchy information managed by the hierarchy information management unit 46 to the monitoring device 2, a hierarchy information providing unit 47 refers to the hierarchy information from the hierarchy information management unit 46, converts the hierarchy information, and transmits the resultant hierarchy information to the monitoring device 2 via the management communication unit 42.

An operating state data distribution unit 48 acquires operating state data from the hierarchy information management unit 46, and distributes the operating state data to the monitoring device 2 via the management communication unit 42. The operating state data distribution unit 48 distributes operating state data to the monitoring device 2 each time the operating state data is updated.

A display processing unit 49 performs processing for display on the display unit 43. The display processing unit 49 receives hierarchy information and operating state data, and performs processing to display the hierarchy information and the operating state data on the display unit 43.

The functions of the hierarchy information management unit 46, the hierarchy information providing unit 47, the operating state data distribution unit 48, and the display processing unit 49 are implemented by a combination of the processor 44 and software. The functions of the hierarchy information management unit 46, the hierarchy information providing unit 47, the operating state data distribution unit 48, and the display processing unit 49 may be implemented by a combination of the processor 44 and firmware, or may be implemented by a combination of the processor 44, software, and firmware. Software or firmware is described as a program and stored in the memory 45. The processor 44 reads software or firmware. The processor 44 executes software or firmware.

The memory 45 stores, as various types of information on production devices or facility devices, the hierarchy information of the hierarchy information management device 4 of the local system 3 and the operating state data of the instrument to be controlled acquired from the control instrument 5. The memory 45 holds the data received by the management communication unit 42. The memory 45 accumulates the data received by the management communication unit 42 as needed, whereby operating state data that is time-series data representing the state of the monitoring targets is stored in the memory 45.

Figure 5:
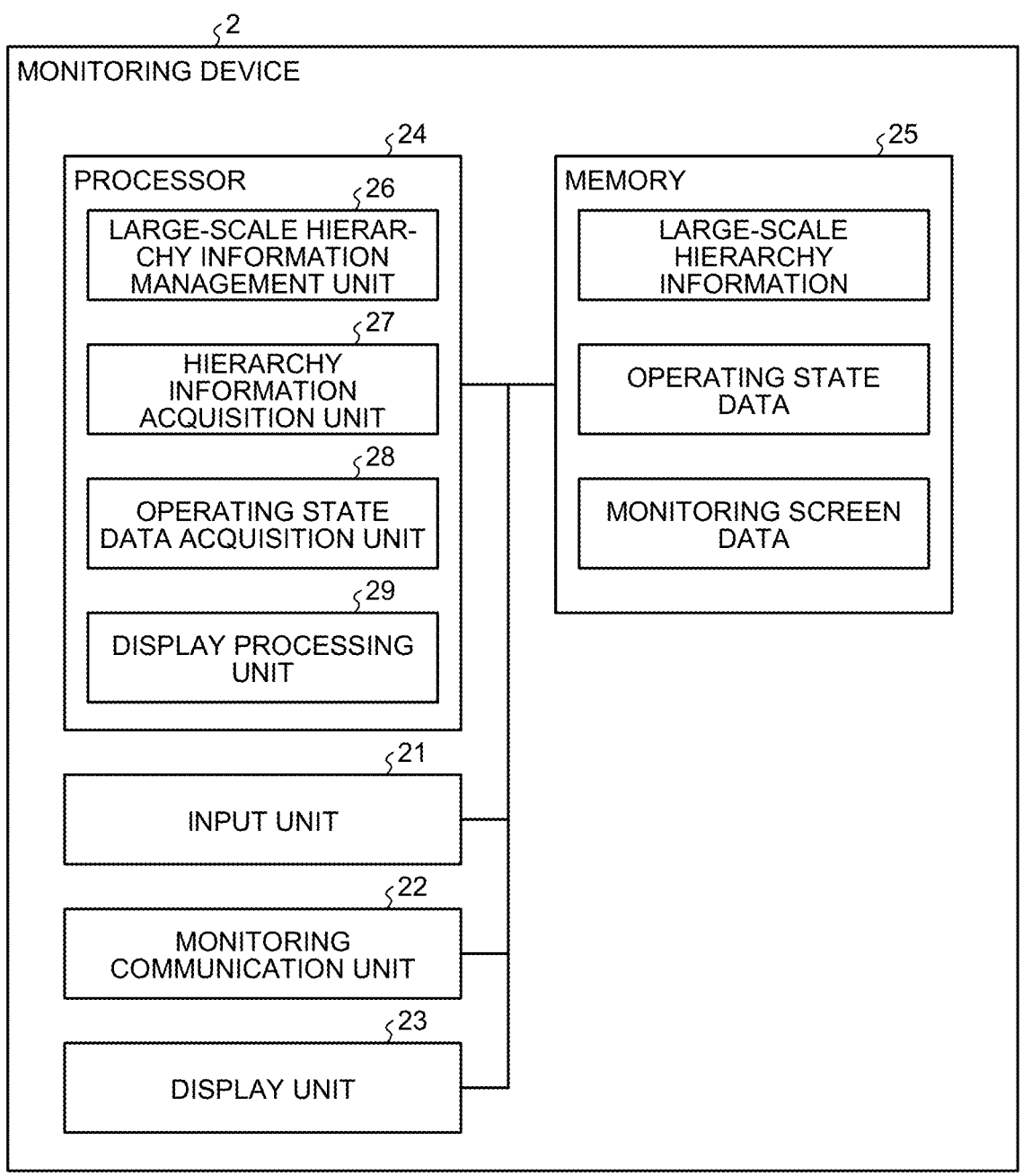
FIG. 5 is a diagram illustrating a functional configuration of a monitoring device of the monitoring system according to the first embodiment.

FIG. 5 is a diagram illustrating a functional configuration of the monitoring device of the monitoring system according to the first embodiment. The monitoring device 2 acquires the hierarchy information of each local system 3 from a plurality of hierarchy information management devices 4. The monitoring device 2 connects the hierarchy information of the local systems 3 acquired from the plurality of hierarchy information management devices 4 to generate large-scale hierarchy information, i.e. large-scale hierarchy information in which the hierarchy information of the plurality of 5 hierarchy information management devices 4 is connected in a hierarchy structure, and displays the large-scale hierarchy information.

The monitoring device 2 includes an input unit 21 to which information is input, a monitoring communication unit 22 that communicates with the hierarchy information management device 4, a display unit 23 that displays information, a processor 24 that executes various processes, and a memory 25 that stores information.

The input unit 21 is a device such as a keyboard, a mouse, or a touch panel. Information is input to the input unit 21 through an operator's operation. The monitoring communication unit 22 is an interface for connection with a device outside the monitoring device 2.

The monitoring communication unit 22 of the monitoring device 2 and the management communication unit 42 of the hierarchy information management device 4 can bidirectionally communicate with each other. The display unit 23 displays information on a screen.

The processor 24 is a CPU. The processor 24 may be a processing device, a computing device, a microprocessor, a microcomputer, or a DSP. The memory 25 includes a RAM, a ROM, a flash memory, an EPROM or EEPROM (registered trademark), an HDD, or an SSD. The processing program of the monitoring device 2 is stored in the memory 25. The processor 24 executes a program stored in the memory 25.

FIG. 5 depicts a functional configuration of the monitoring device 2 implemented by using the processor 24. A large-scale hierarchy information management unit 26 connects the hierarchy information 50 of the local systems 3 acquired from the plurality of hierarchy information management devices 4 to generate and manage the large-scale hierarchy information 60, i.e. hierarchy information which is larger in scale than the hierarchy information of the local systems 3 and in which the multiple pieces of hierarchy information 50 are connected in a hierarchy structure. The large-scale hierarchy information management unit 26 can convert the hierarchy information 50 of the local system 3 into data of large-scale hierarchy information, import the data into an appropriate layer in the large-scale hierarchy information 60, and generate the large-scale hierarchy information 60. The large-scale hierarchy information 60 is second hierarchy information in the monitoring system 1. The large-scale hierarchy information management unit 26 is a second hierarchy information management unit in the monitoring system 1.

The large-scale hierarchy information management unit 26 imports the hierarchy information 50 of the local system 3 into a designated layer in the large-scale hierarchy information 60 based on import position information indicating the import position of the hierarchy information 50 of the local system 3 in the large-scale hierarchy information 60, and generates the large-scale hierarchy information 60. The import position information is input from the input unit 21.

In the monitoring system 1, because the large-scale hierarchy information management unit 26 automatically generates the large-scale hierarchy information 60, it is possible to save the user the trouble of manually setting the hierarchy information 50 of the plurality of local systems 3 in the large-scale hierarchy information 60 of the monitoring system 1.

In addition, the large-scale hierarchy information management unit 26 has a function of adding information on monitoring screen data of each layer of the hierarchy information 50 of the local system 3 to each layer corresponding to the hierarchy information 50 of the local system 3 in the generated large-scale hierarchy information 60. The large-scale hierarchy information management unit 26 adds information on monitoring screen data to each layer corresponding to the hierarchy information 50 of the local system 3 in the large-scale hierarchy information 60 based on monitoring screen data addition information which is an instruction to add information on the monitoring screen data of each layer of the hierarchy information 50 of the local system 3. The large-scale hierarchy information management unit 26 stores the generated large-scale hierarchy information 60 in the memory 25. Monitoring screen data is data for displaying, on the display unit 23, a monitoring screen for monitoring the operating state of production devices and/or facility devices that are monitoring targets. Information on monitoring screen data is information indicating monitoring screen data.

As described above, in the monitoring system 1, information on monitoring screen data for displaying the monitoring screen corresponding to each layer of the large-scale hierarchy information 60 is added to each layer of the large-scale hierarchy information 60, whereby by designating a layer in the large-scale hierarchy information 60, the monitoring screen and the monitoring screen data corresponding to the designated layer are identified. Consequently, in the monitoring system 1, it is easy to identify the monitoring screen data for displaying the monitoring screen, and thus it is possible to display the monitoring screen easily and automatically on the display unit 23.

A hierarchy information acquisition unit 27 acquires the hierarchy information 50 of each local system 3 from a plurality of hierarchy information management devices 4 via the monitoring communication unit 22. The hierarchy information acquisition unit 27 transmits the multiple pieces of hierarchy information 50 acquired to the large-scale hierarchy information management unit 26.

An operating state data acquisition unit 28 acquires, from the hierarchy information management devices 4 of the plurality of local systems 3 via the monitoring communication unit 22, operating state data indicating the operating state of production devices and facility devices indicated by the hierarchy information 50 of each local system 3, and transmits the operating state data to the large-scale hierarchy information management unit 26. The operating state data acquisition unit 28 receives operating state data each time the operating state data is updated.

A display processing unit 29 performs processing for display on the display unit 23. The display processing unit 29 receives the hierarchy information 50 and operating state data, and performs processing to display the hierarchy information 50 and the operating state data on the display unit 23. In accordance with instruction information input from the input unit 21, the display processing unit 29 causes the display unit 23 to display a screen corresponding to the instruction information. The display processing unit 29 causes the display unit 23 to switch to a screen that depends on the layer selected by the instruction information.

The functions of the large-scale hierarchy information management unit 26, the hierarchy information acquisition unit 27, the operating state data acquisition unit 28, and the display processing unit 29 are implemented by a combination of the processor 24 and software. The functions of the large-scale hierarchy information management unit 26, the hierarchy information acquisition unit 27, the operating state data acquisition unit 28, and the display processing unit 29 may be implemented by a combination of the processor 24 and firmware, or may be implemented by a combination of the processor 24, software, and firmware. Software or firmware is described as a program and stored in the memory 25. The processor 24 reads software or firmware. The processor 24 executes software or firmware.

The memory 25 stores operating state data, the large-scale hierarchy information 60, and monitoring screen data. The memory 25 may store the hierarchy information 50 of the local system 3.

Figure 6:
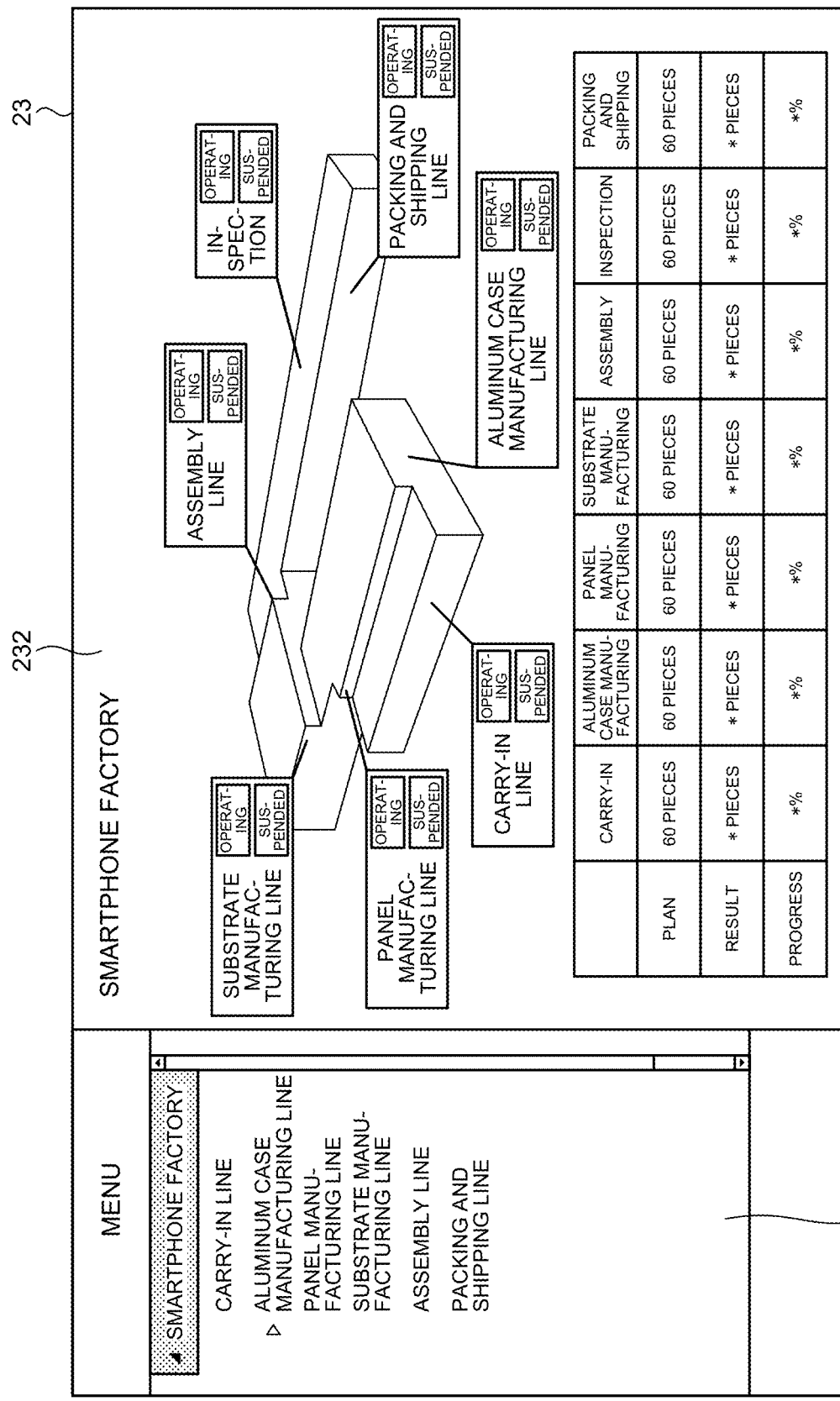
FIG. 6 is a diagram illustrating an example of a monitoring screen of the monitoring system according to the first embodiment.
Figure 7:
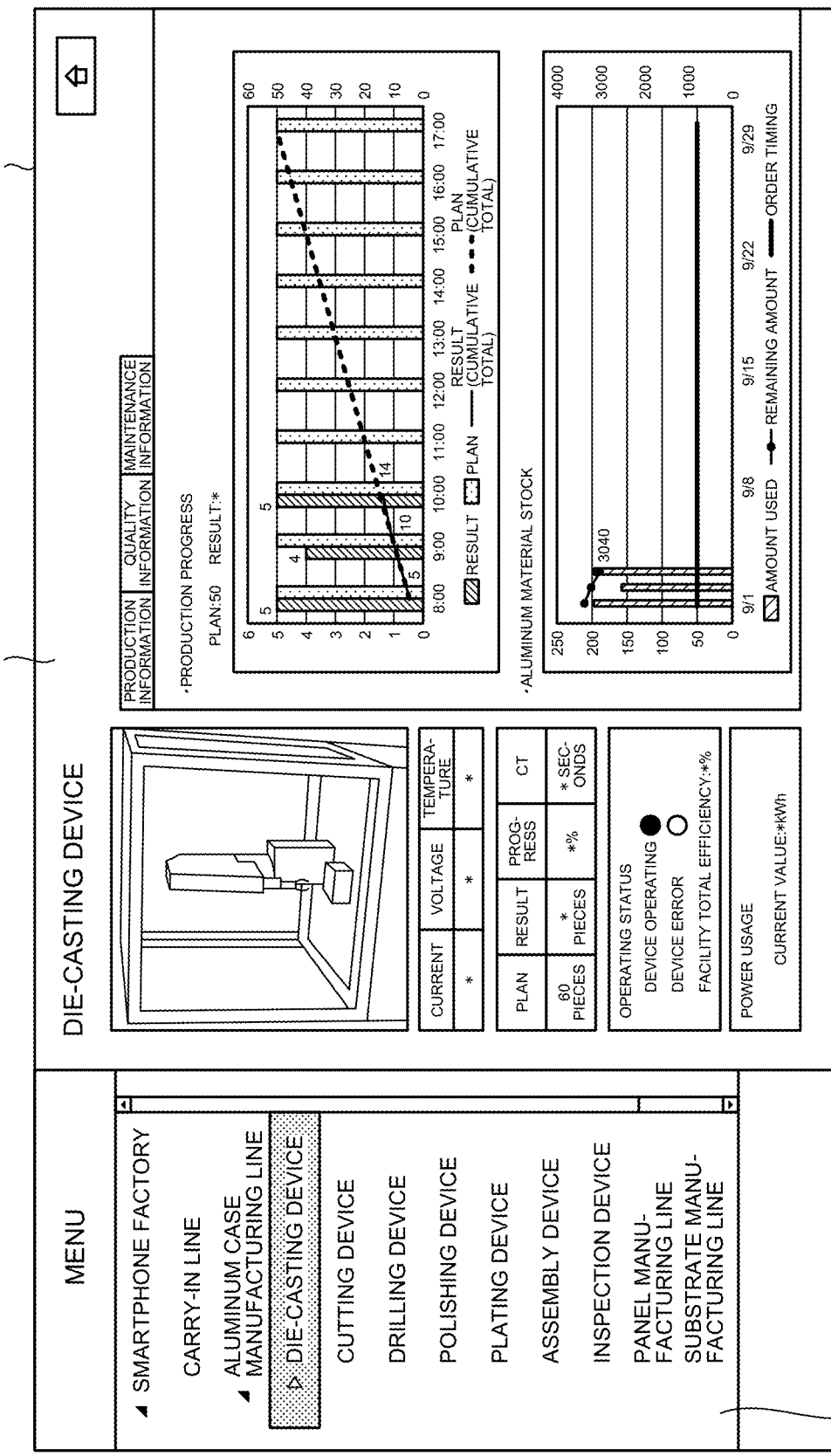
FIG. 7 is a diagram illustrating another example of a monitoring screen of the monitoring system according to the first embodiment.

FIG. 6 is a diagram illustrating an example of a monitoring screen of the monitoring system according to the first embodiment. FIG. 7 is a diagram illustrating another example of a monitoring screen of the monitoring system according to the first embodiment. As illustrated in FIG. 6, the display unit 23 includes a menu display 231 on which the user selects the monitoring screen to be displayed, and a screen display 232 on which the monitoring screen selected by the user on the menu display 231 is displayed. The menu display 231 shows the hierarchy in the large-scale hierarchy information 60. In FIG. 6, the layer "smartphone factory" in the large-scale hierarchy information 60 shown on the menu display 231 is selected. In FIG. 7, the layer below the layer "smartphone factory" is shown on the menu display 231, and the layer "die-casting device" is selected. In FIGS. 6 and 7, the monitoring screen corresponding to the selected layer is displayed on the screen display 232.

Figure 8:
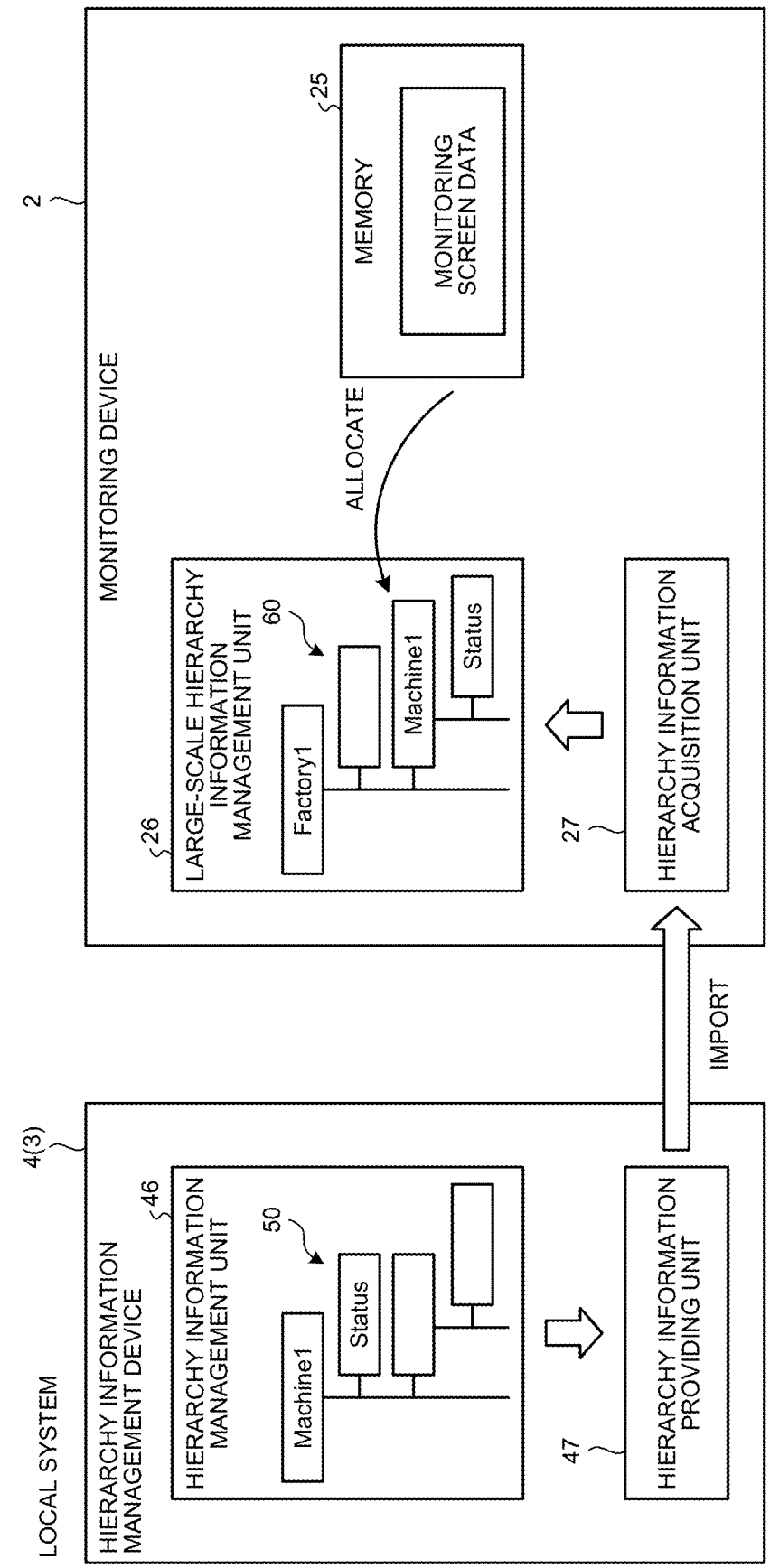
FIG. 8 is a diagram schematically illustrating a method for generating large-scale hierarchy information in the monitoring system according to the first embodiment.
Figure 9:
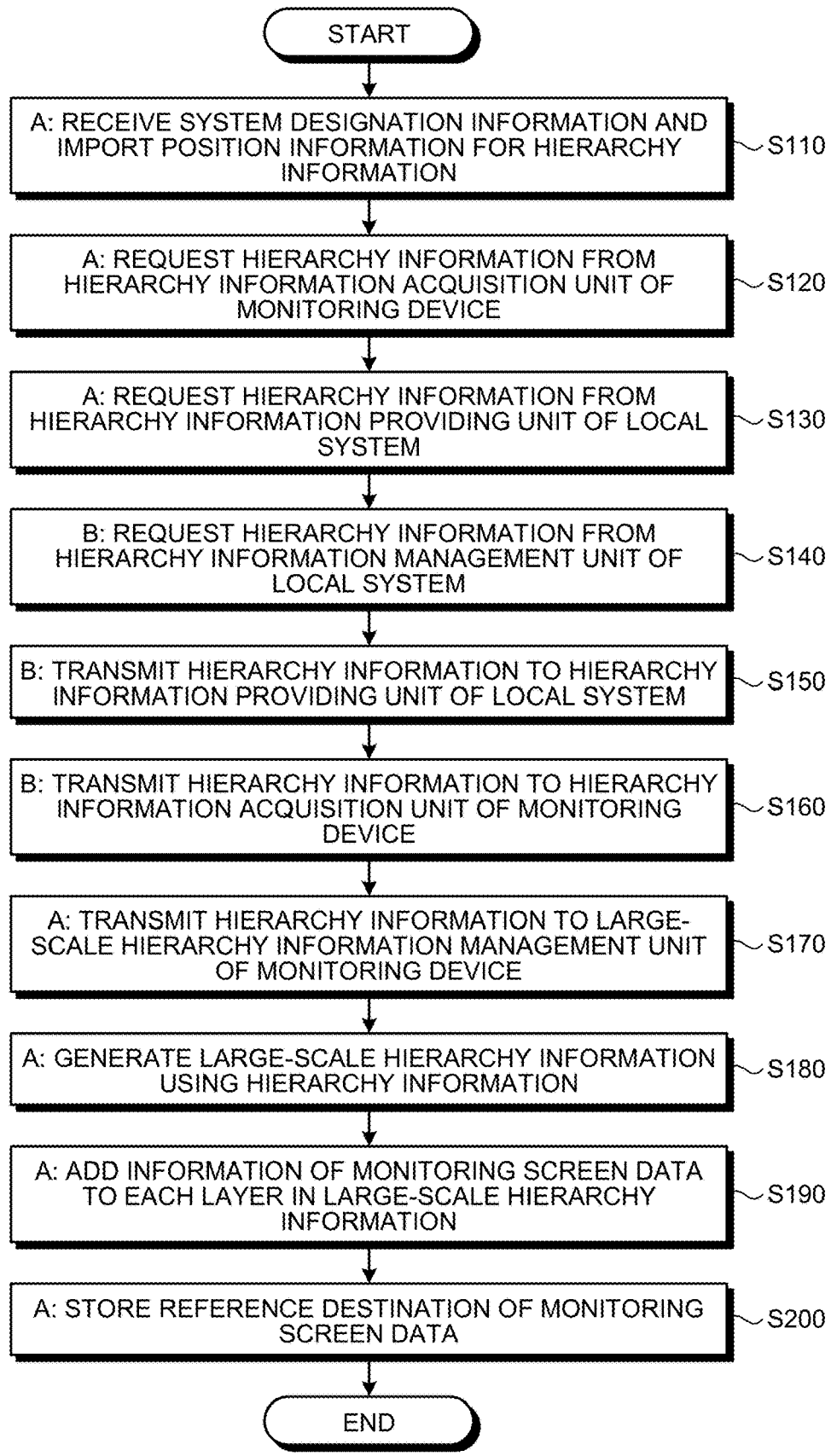
FIG. 9 is a flowchart illustrating a procedure of the method for generating large-scale hierarchy information in the monitoring system according to the first embodiment.

Next, a method for importing hierarchy information into the monitoring device 2 in the monitoring system 1 will be described with reference to FIGS. 4, 5, 8, and 9. FIG. 8 is a diagram schematically illustrating a method for generating large-scale hierarchy information in the monitoring system according to the first embodiment. FIG. 9 is a flowchart illustrating a procedure of the method for generating large-scale hierarchy information in the monitoring system according to the first embodiment. FIG. 9 illustrates a case where the hierarchy information 50 of a new local system 3 that has not been imported to the monitoring device 2 is imported to the monitoring device 2 so that the large-scale hierarchy information 60 is generated. In FIG. 9, "A:" indicates a process in the monitoring device 2, and "B:" indicates a process in the hierarchy information management device 4. The same applies to the subsequent flowcharts.

(Processing in Monitoring Device)

First, in step S110, the large-scale hierarchy information management unit 26 of the monitoring device 2 receives system designation information indicating the local system whose hierarchy information 50 is to be imported, and import position information indicating where in the framework of the large-scale hierarchy information 60 the hierarchy information 50 of the new local system 3 is to be imported. Prior to the import of the hierarchy information 50 of the new local system 3, the framework of the large-scale hierarchy information 60 created by the user is stored in the memory 25, with a layer left empty for the hierarchy information 50 to be imported from the local system 3. The system designation information and the import position information are input from the input unit 21 by the user. Note that the system designation information can be rephrased as information indicating the hierarchy information management device 4 from which the hierarchy information 50 is to be imported.

In step S120, the large-scale hierarchy information management unit 26 designates the hierarchy information management device 4 of the local system 3 indicated by the system designation information as the acquisition source of the hierarchy information 50, and requests the hierarchy information 50 from the hierarchy information acquisition unit 27 of the monitoring device 2.

In step S130, the hierarchy information acquisition unit 27 requests the hierarchy information 50 from the hierarchy information providing unit 47 of the hierarchy information management device 4 of the local system 3 designated as the acquisition source.

(Processing in Local System)

In step S140, the hierarchy information providing unit 47 of the hierarchy information management device 4 of the local system 3 that has received the request for the hierarchy information 50 requests the hierarchy information 50 from the hierarchy information management unit 46 of the hierarchy information management device 4.

In step S150, the hierarchy information management unit 46 transmits the hierarchy information 50 to the hierarchy information providing unit 47.

In step S160, the hierarchy information providing unit 47 converts the hierarchy information 50 acquired from the hierarchy information management unit 46 into a data format for transmission to the monitoring device 2, and transmits the resultant hierarchy information 50 to the hierarchy information acquisition unit 27 of the monitoring device 2.

(Processing in Monitoring Device)

In step S170, the hierarchy information acquisition unit 27 of the monitoring device 2 converts the hierarchy information 50 acquired from the hierarchy information providing unit 47 into a data format for transmission to the large-scale hierarchy information management unit 26 of the monitoring device 2, and transmits the resultant hierarchy information 50 to the large-scale hierarchy information management unit 26.

In step S180, the large-scale hierarchy information management unit 26 generates the large-scale hierarchy information 60 using the hierarchy information 50 acquired from the hierarchy information acquisition unit 27. That is, the large-scale hierarchy information management unit 26 places the hierarchy information 50 in the layer indicated by the import position information to generate the large-scale hierarchy information 60.

In step S190, the large-scale hierarchy information management unit 26 adds, to each layer in the large-scale hierarchy information 60, information on monitoring screen data for displaying a monitoring screen corresponding to each layer. The large-scale hierarchy information management unit 26 adds the information on the monitoring screen data to the large-scale hierarchy information 60 according to monitoring screen data addition information which is an instruction to add the information on the monitoring screen data to each layer of the large-scale hierarchy information 60. The monitoring screen data addition information is input from the input unit 21 by the user.

In step S200, the large-scale hierarchy information management unit 26 stores information on an area of the memory 25 to which the display processing unit 29 refers when acquiring the monitoring screen data (reference destination of the monitoring screen data). In addition, the large-scale hierarchy information management unit 26 may add the monitoring screen data itself to the large-scale hierarchy information 60. In this case, the reference destination of the monitoring screen data is the large-scale hierarchy information 60 stored in the memory 25. Then, the large-scale hierarchy information management unit 26 stores the large-scale hierarchy information 60 in the memory 25.

The above process, which has been described as a method for importing new hierarchy information 50 from one local system 3 to the monitoring device 2, is similarly repeated so that new hierarchy information 50 is imported from a plurality of local systems 3 to the monitoring device 2 and the large-scale hierarchy information 60 is generated.

Figure 10:
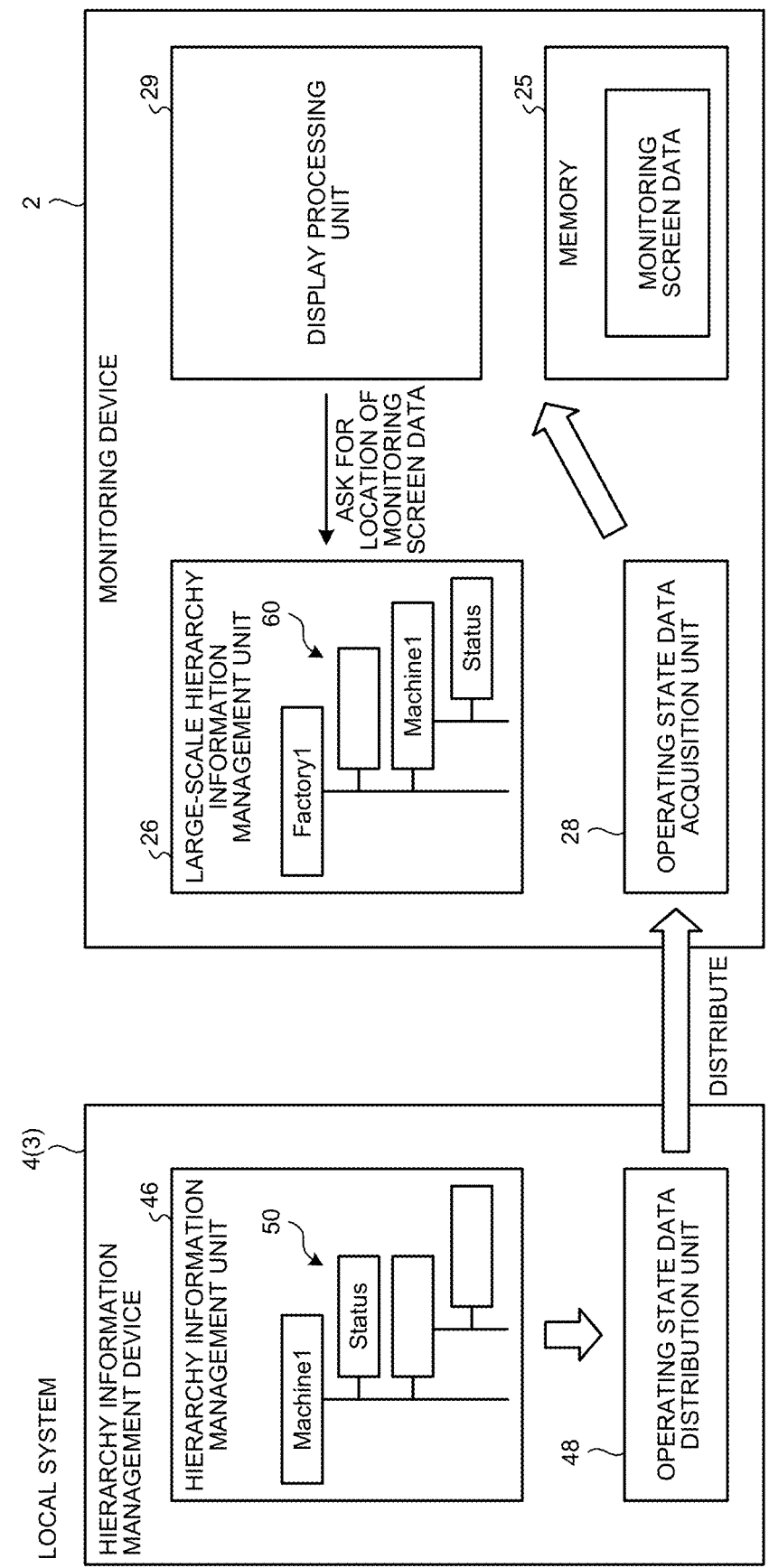
FIG. 10 is a diagram schematically illustrating a method for displaying a monitoring screen in the monitoring device of the monitoring system according to the first embodiment.
Figure 11:
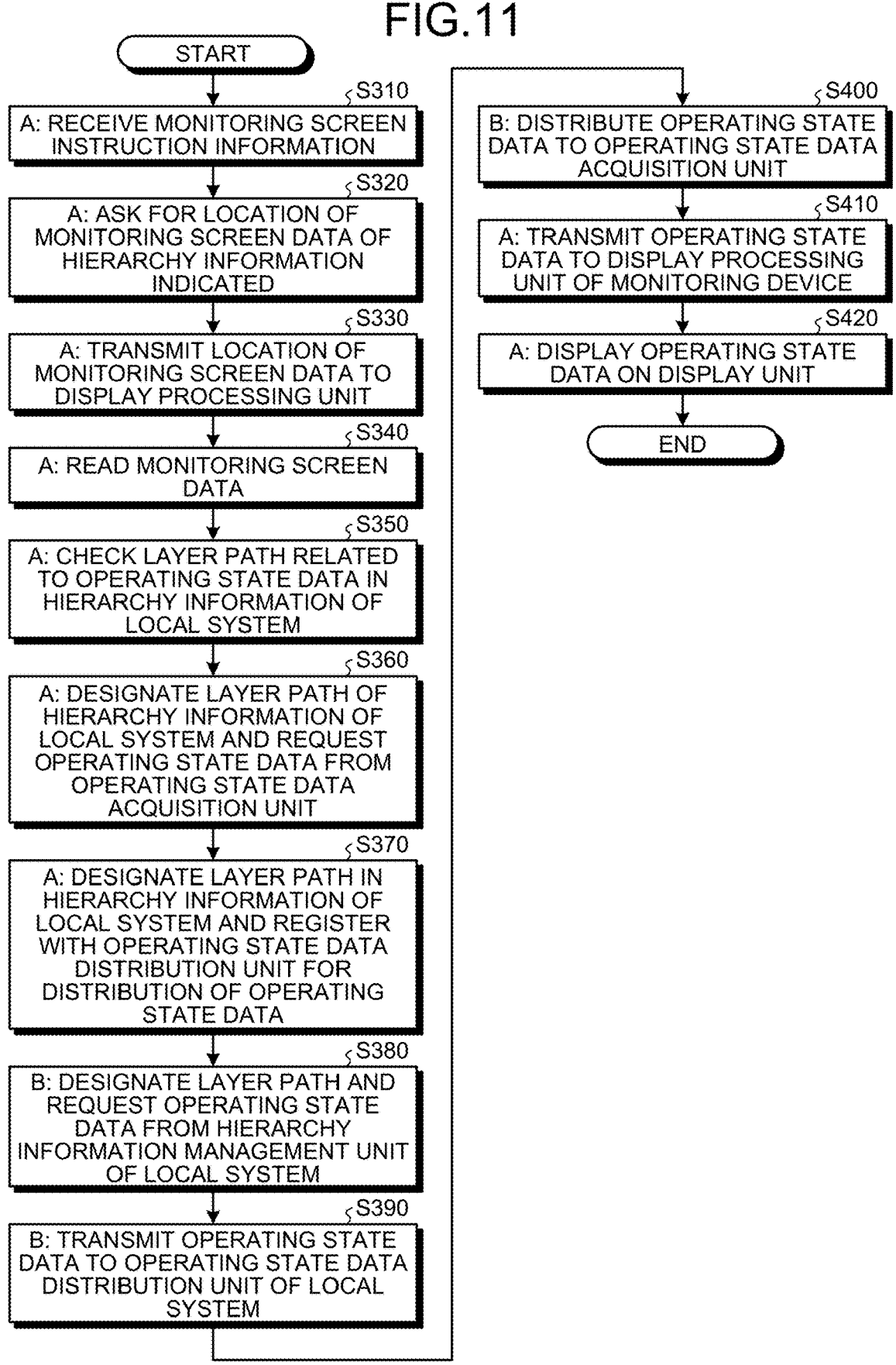
FIG. 11 is a flowchart illustrating a procedure of the method for displaying a monitoring screen in the monitoring device of the monitoring system according to the first embodiment.

Referring to FIGS. 4, 5, 10, and 11, a method for displaying a monitoring screen in the monitoring device 2 will be described. FIG. 10 is a diagram schematically illustrating a method for displaying a monitoring screen in the monitoring device of the monitoring system according to the first embodiment. FIG. 11 is a flowchart illustrating a procedure of the method for displaying a monitoring screen in the monitoring device of the monitoring system according to the first embodiment. Thick arrows in FIG. 10 indicate the flow of operating state data.

(Processing in Monitoring Device)

In step S310, while a monitoring screen is opened on the display unit 23, the display processing unit 29 receives monitoring screen instruction information indicating the monitoring screen to be displayed on the display unit 23. The monitoring screen instruction information is input from the input unit 21 by the user.

In step S320, the display processing unit 29 asks the large-scale hierarchy information management unit 26 for the location of the monitoring screen data for displaying the monitoring screen indicated by the monitoring screen instruction information, namely the information on the monitoring screen data added to the hierarchy information 50 in the large-scale hierarchy information 60.

In step S330, the large-scale hierarchy information management unit 26 transmits the reference destination of the monitoring screen data to the display processing unit 29 as the location of the monitoring screen data requested.

In step S340, the display processing unit 29 reads monitoring screen data from the reference destination of the monitoring screen data acquired from the large-scale hierarchy information management unit 26, and displays the monitoring screen.

In step S350, the display processing unit 29 checks the layer path related to the operating state data of the read monitoring screen data in the hierarchy information 50 of the hierarchy information management device 4 of the local system 3. The layer path related to the operating state data in the hierarchy information 50 of the hierarchy information management device 4 of the local system 3 is stored in the monitoring screen data.

In step S360, the display processing unit 29 designates the layer path of the operating state data in the hierarchy information 50 of the hierarchy information management device 4 of the local system 3, and requests the operating state data from the operating state data acquisition unit 28 of the monitoring device 2.

In step S370, the operating state data acquisition unit 28 requests the operating state data from the operating state data distribution unit 48 of the hierarchy information management device 4 of the local system 3 by designating the layer path of the operating state data in the hierarchy information 50 of the hierarchy information management device 4 of the local system 3. That is, the operating state data acquisition unit 28 designates the layer path of the operating state data in the hierarchy information 50 of the hierarchy information management device 4, and registers with the operating state data distribution unit 48 to request the distribution of the operating state data from the operating state data distribution unit 48. The term "distribution" means that the operating state data is transmitted to the operating state data acquisition unit 28 every time the operating state data changes.

(Processing in Local System)

In step S380, the operating state data distribution unit 48 designates the layer path of the operating state data in the hierarchy information 50, and requests the operating state data from the hierarchy information management unit 46 of the hierarchy information management device 4 of the local system 3.

In step S390, the hierarchy information management unit 46 acquires the operating state data from the hierarchy information 50 based on the designated layer path, and transmits the operating state data to the operating state data distribution unit 48. Each time the operating state data associated with the designated layer path is updated, the hierarchy information management unit 46 transmits the updated operating state data to the operating state data distribution unit 48.

In step S400, the operating state data distribution unit 48 distributes the acquired operating state data to the operating state data acquisition unit 28 of the monitoring device 2. Each time the operating state data is updated, the operating state data distribution unit 48 acquires the updated operating state data from the hierarchy information management unit 46 and distributes the operating state data to the operating state data acquisition unit 28 of the monitoring device 2.

(Processing in Monitoring Device) In step S410, the operating state data acquisition unit 28 of the monitoring device 2 transmits the acquired operating state data to the display processing unit 29 of the monitoring device 2.

In step S420, the display processing unit 29 causes the display unit 23 to display the acquired operating state data.

Note that the operating state data acquisition unit 28 and the display processing unit 29 of the monitoring device 2 may store and save the acquired operating state data.

In addition, the monitoring system 1 monitoring device 2 may include the hierarchy information management device 4 to form the local system 3. However, when the hierarchy information 50 managed by the hierarchy information management unit of the local system 3 and the large-scale hierarchy information 60 managed by the hierarchy information management unit of the monitoring device 2 are in different configurations or in different forms, the management methods, addition methods, editing methods, and deletion methods also vary. Furthermore, the monitoring device 2 may exist on a cloud server.

The monitoring system 1 according to the first embodiment described above, which is designed to display and monitor, in the monitoring device 2, the operating state of the control instruments 5 of a plurality of local systems 3, can acquire the hierarchy information 50 for the hierarchy information management device 4 from the local systems 3 and create the large-scale hierarchy information 60 for the monitoring device 2 using the acquired hierarchy information 50. Consequently, in the monitoring system 1, the monitoring device 2 can automatically create the large-scale hierarchy information 60 including the hierarchy information 50 of the plurality of local systems 3 by application of the hierarchy information 50 in the plurality of local systems 3. Therefore, in the monitoring system 1, it is easy to construct the large-scale hierarchy information 60, and it is possible to reduce the man-hours required of the user for displaying and monitoring, in the monitoring device 2, the operating state of the control instruments 5 in the plurality of local systems 3.

In addition, in the monitoring system 1, information on monitoring screen data for displaying a monitoring screen corresponding to each layer of the large-scale hierarchy information 60 is added to each layer of the large-scale hierarchy information 60. Consequently, in the monitoring system 1, by designating a layer in the large-scale hierarchy information 60, the monitoring screen and the monitoring screen data corresponding to the designated layer are identified, so that the monitoring screen can be easily and automatically displayed on the display unit 23. Then, in the monitoring system 1, the monitoring device 2 can automatically acquire the operating state data corresponding to the monitoring screen displayed on the display unit 23 from the local system 3 and display the acquired operating state data on the monitoring screen in real time. Therefore, in the monitoring system 1, it is possible to display and monitor, in the monitoring device 2, the operating state of the control instruments 5 in the plurality of local systems 3.

Then, in the monitoring system 1, by changing the layer designated in the large-scale hierarchy information 60, it is possible to easily change the monitoring screen displayed on the display unit 23 to the monitoring screen of the desired layer in the large-scale hierarchy information 60. Therefore, in the monitoring system 1, it is possible to easily monitor, in the monitoring device 2, the operating state of the control instruments 5 in the plurality of local systems 3.

Second Embodiment

Figure 12:
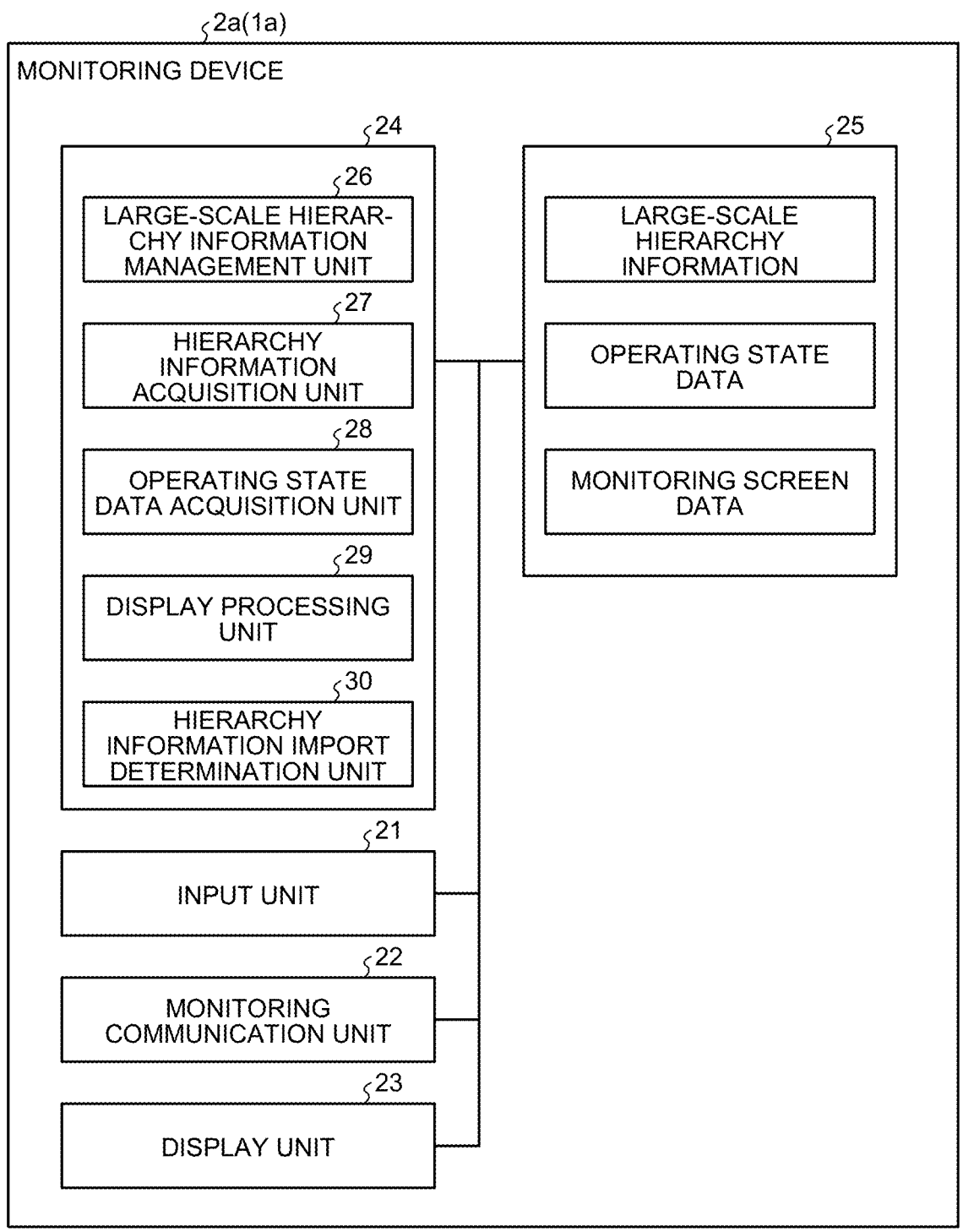
FIG. 12 is a diagram illustrating a functional configuration of a monitoring device of a monitoring system according to a second embodiment.
Figure 13:
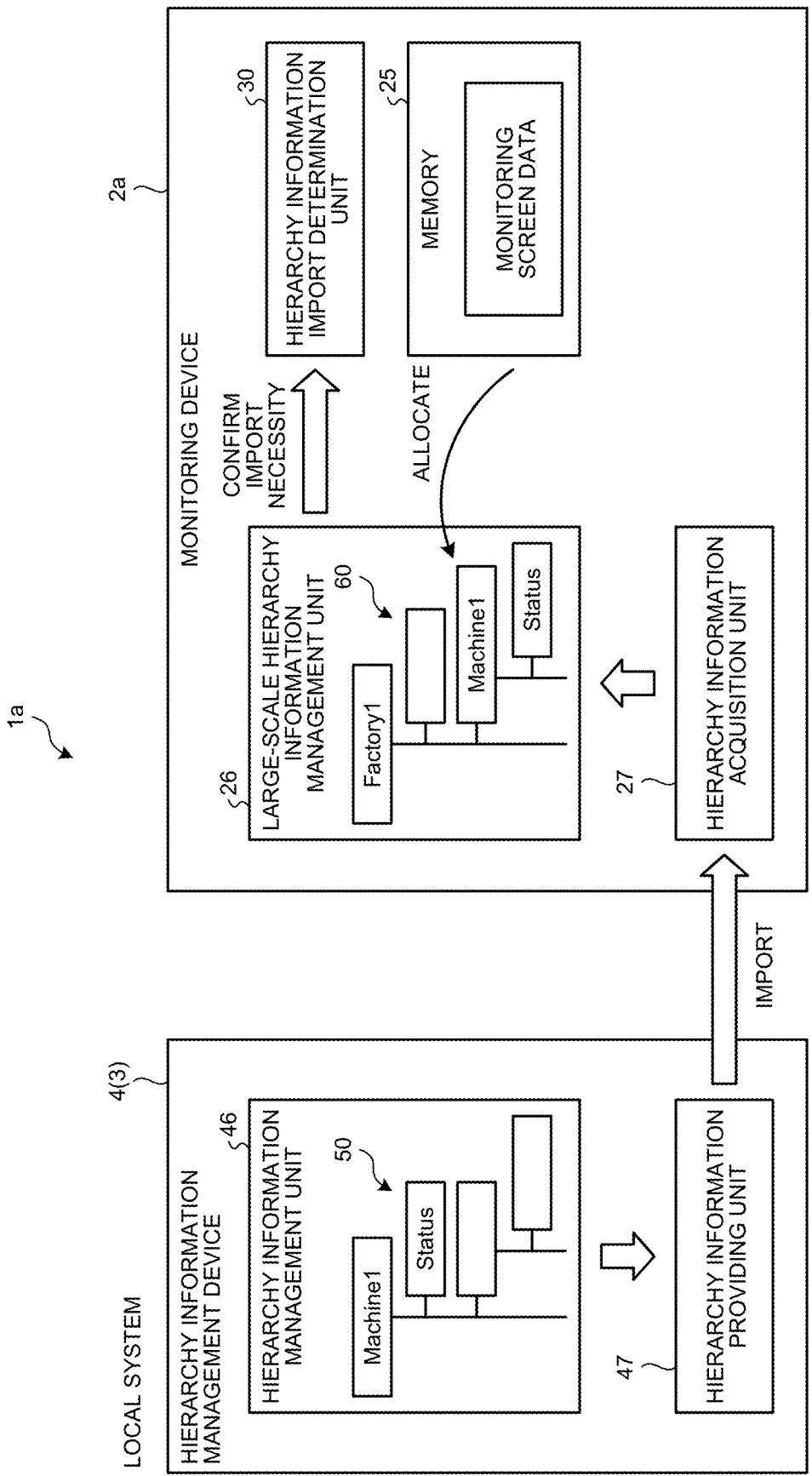
FIG. 13 is a diagram schematically illustrating a method for generating large-scale hierarchy information in the monitoring system according to the second embodiment.

FIG. 12 is a diagram illustrating a functional configuration of a monitoring device of a monitoring system according to a second embodiment. FIG. 13 is a diagram schematically illustrating a method for generating large-scale hierarchy information in the monitoring system according to the second embodiment. Thick arrows in FIG. 13 indicate the flow of the hierarchy information 50. A monitoring system 1a according to the second embodiment is different from the monitoring system 1 according to the first embodiment in that the monitoring system 1a includes a monitoring device 2a formed by adding a hierarchy information import determination unit 30 to the monitoring device 2.

In the process of importing the hierarchy information 50 of the hierarchy information management device 4 of a new local system 3 into the large-scale hierarchy information 60, the hierarchy information import determination unit 30 makes an import necessity determination, that is, determines based on predetermined designation conditions whether the information included in the hierarchy information 50 of the hierarchy information management device 4 of the local system 3 needs to be imported into the large-scale hierarchy information 60. The import necessity determination is a determination as to whether the information included in the hierarchy information 50 of the hierarchy information management device 4 of the local system 3 needs to be imported into the large-scale hierarchy information 60, in other words, a determination in which information that needs to be imported into the large-scale hierarchy information 60 is selected from among the information included in the hierarchy information 50 of the hierarchy information management device 4 of the local system 3. Designation conditions are criteria for the hierarchy information import determination unit 30 to determine in the import necessity determination whether the information included in the hierarchy information 50 needs to be imported into the large-scale hierarchy information 60. That is, in the import necessity determination, information that needs to be imported into the large-scale hierarchy information 60 is identified from among the information included in the new hierarchy information 50.

Designation conditions are character string pattern comparison and/or value comparison designated in terms of the following conditions related to the hierarchy information 50 of the hierarchy information management device 4 of the local system 3: layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer. Data type is the data type of operating state data. Data value is the actual current value of operating state data. Access right includes access right for reading the hierarchy information 50 and access right for writing to the hierarchy information 50. Character string pattern comparison is a comparison with the character string pattern designated by the user. Value comparison is a comparison with the value designated by the user. The designation conditions are determined in advance or by the user, and are stored in the memory 25 of the monitoring device 2a. The designation conditions can be changed by the user. Note that the designation conditions may be stored in the hierarchy information import determination unit 30.

The large-scale hierarchy information management unit 26 imports the hierarchy information 50 of the hierarchy information management device 4 of the new local system 3 based on the determination result in the hierarchy information import determination unit 30, and generates the large-scale hierarchy information 60.

Figure 14:
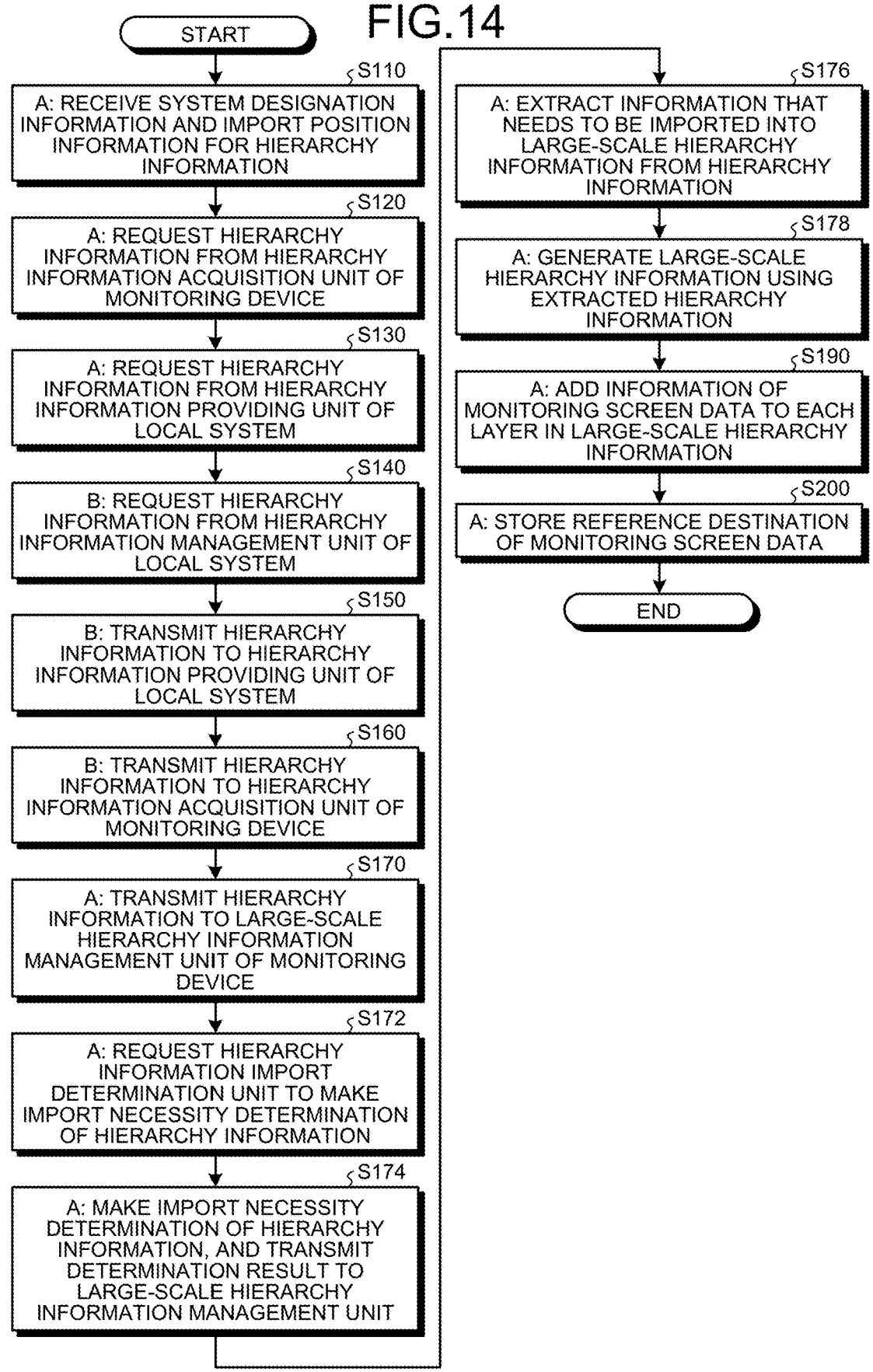
FIG. 14 is a flowchart illustrating a procedure of the method for generating large-scale hierarchy information in the monitoring system according to the second embodiment.

FIG. 14 is a flowchart illustrating a procedure of the method for generating large-scale hierarchy information in the monitoring system according to the second embodiment. Hereinafter, differences between the flowchart of FIG. 14 and the flowchart illustrated in FIG. 9 in the first embodiment will be described.

(Processing in Monitoring Device)

Step S170 is followed by step S172, in which the large-scale hierarchy information management unit 26 of the monitoring device 2a transmits the received hierarchy information 50 to the hierarchy information import determination unit 30, and requests the hierarchy information import determination unit 30 to make an import necessity determination to check whether the hierarchy information 50 needs to be imported.

In step S174, the hierarchy information import determination unit 30 compares the hierarchy information 50 received from the large-scale hierarchy information management unit 26 with the designation conditions to make the import necessity determination of the hierarchy information 50. Specifically, the hierarchy information import determination unit 30 extracts information matching the designation conditions in the hierarchy information 50 received from the large-scale hierarchy information management unit 26. The hierarchy information import determination unit 30 transmits the extracted information, that is, the information matching the designation conditions in the hierarchy information 50 received from the large-scale hierarchy information management unit 26, to the large-scale hierarchy information management unit 26 as the determination result of the import necessity determination.

In step S176, based on the determination result received from the hierarchy information import determination unit 30, the large-scale hierarchy information management unit 26 extracts only the information that needs to be imported into the large-scale hierarchy information 60 from the information included in the hierarchy information 50, and generates extracted hierarchy information including only the information that needs to be imported into the large-scale hierarchy information 60. That is, based on the determination result received from the hierarchy information import determination unit 30, the large-scale hierarchy information management unit 26 removes unnecessary information from the information included in the hierarchy information 50 to extract only the information that needs to be imported into the large-scale hierarchy information 60 so as to reduce the amount of information to be imported into the large-scale hierarchy information 60. Thereafter, the procedure proceeds to step S178.

In step S178, the large-scale hierarchy information management unit 26 generates the large-scale hierarchy information 60 using the extracted hierarchy information acquired from the hierarchy information acquisition unit 27. That is, the large-scale hierarchy information management unit 26 places the extracted hierarchy information in the layer indicated by the import position information to generate the large-scale hierarchy information 60.

Therefore, in the second embodiment, the large-scale hierarchy information management unit 26 imports only the partial information matching the designation conditions among the information included in the hierarchy information 50 into the large-scale hierarchy information 60 based on the determination result of the import necessity determination, rather than avoiding importing the whole of one piece of hierarchy information 50 acquired. For example, based on the determination result of the import necessity determination, the large-scale hierarchy information management unit 26 performs a process of limiting the number of layers to be imported into the large-scale hierarchy information 60 among the information included in the hierarchy information 50 to three layers, and importing only the partial information corresponding to the three layer among the information included in the hierarchy information 50 into the large-scale hierarchy information 60.

As described above, in the monitoring system 1a according to the second embodiment, the large-scale hierarchy information management unit 26 of the monitoring device 2a makes an import necessity determination of the hierarchy information 50 received from the hierarchy information management device 4 based on the designation conditions. Then, the large-scale hierarchy information management unit 26 identifies the information that needs to be imported into the large-scale hierarchy information 60 among the information included in the new hierarchy information 50 based on the determination result of the import necessity determination, and imports only the information identified as needing to be imported into the large-scale hierarchy information 60 among the information included in the new hierarchy information 50 to generate or update the large-scale hierarchy information 60. That is, the large-scale hierarchy information management unit 26 imports the extracted hierarchy information obtained by reducing the amount of information included in the new hierarchy information 50 to generate or update the large-scale hierarchy information 60. Consequently, it is possible to generate the large-scale hierarchy information 60 using only the hierarchy information 50 necessary for monitoring in the monitoring system 1a, and it is possible to prevent the large-scale hierarchy information 60 from becoming too large.

Third Embodiment

Figure 15:
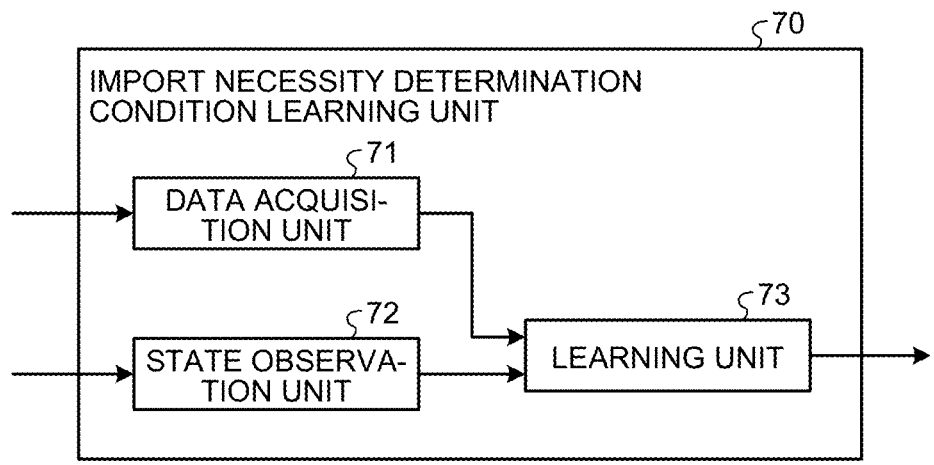
FIG. 15 is a diagram illustrating a configuration of an import necessity determination condition learning unit provided in a monitoring system according to a third embodiment.

FIG. 15 is a diagram illustrating a configuration of an import necessity determination condition learning unit provided in a monitoring system according to a third embodiment.

The import necessity determination condition learning unit 70 is a machine learning device including a data acquisition unit 71, a state observation unit 72, and a learning unit 73.

The data acquisition unit 71 acquires determination data (training data) input by the user. The training data is the result of a determination as to whether information included in the hierarchy information 50 of the hierarchy information management device 4 of a new local system 3 needs to be imported into the large-scale hierarchy information 60 in the process of importing the hierarchy information 50 into the large-scale hierarchy information 60. The data acquisition unit 71 transmits the training data to the learning unit 73. An example of the training data is the above-described extracted hierarchy information. That is, the data acquisition unit 71 acquires the result indicating whether information included in the new hierarchy information 50 needs to be imported into the large-scale hierarchy information 60.

The state observation unit 72 acquires the hierarchy information 50 from the large-scale hierarchy information management unit 26, and extracts, as state variables from the hierarchy information 50 that is input data, information of the hierarchy information 50 including layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer. The state observation unit 72 observes, as state variables, the information of the hierarchy information 50 including layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer. Access right includes access right for reading the hierarchy information 50 and access right for writing to the hierarchy information 50. The state observation unit 72 transmits, to the learning unit 73, the information of the hierarchy information 50 including layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer.

The learning unit 73 learns import necessity determination conditions (learning content) for the hierarchy information 50 based on a data set created based on the combination of: the information of the hierarchy information 50 output from the state observation unit 72, including layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer; and the training data output from the data acquisition unit 71, i.e. determination data that is the result of the determination as to whether information included in the hierarchy information 50 of the hierarchy information management device 4 of the new local system 3 needs to be imported into the large-scale hierarchy information 60 in the process of importing the hierarchy information 50 into the large-scale hierarchy information 60. Here, the data set is data in which the state variables and the determination data are associated with each other. The import necessity determination conditions for the hierarchy information are criteria for determining whether information included in the hierarchy information 50 of the hierarchy information management device 4 of the new local system 3 needs to be imported into the large-scale hierarchy information 60 in the process of importing the hierarchy information 50 into the large-scale hierarchy information 60. The import necessity determination conditions for the hierarchy information correspond to the designation conditions in the second embodiment. That is, the learning unit 73 learns determination conditions that are criteria for determining whether information included in the new hierarchy information 50 needs to be imported into the large-scale hierarchy information 60.

The import necessity determination condition learning unit 70 is used to learn information of the hierarchy information 50 including at least one of layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer, which are import necessity determination conditions for hierarchy information for determining in the monitoring system 1 whether information included in the hierarchy information 50 needs to be imported into the large-scale hierarchy information 60. For example, the import necessity determination condition learning unit 70 may be a device separate from the monitoring system 1 and connected to the monitoring system 1 over a network. Alternatively, the import necessity determination condition learning unit 70 may be incorporated in the monitoring system 1. Still alternatively, the import necessity determination condition learning unit 70 may exist on a cloud server.

The learning unit 73 learns import necessity determination conditions for hierarchy information through what is called supervised learning according to, for example, a neural network model. Here, supervised learning refers to a model that provides a large number of input-result (label) data pairs to a learning device to learn features in those data sets and estimate results from inputs.

Figure 16:
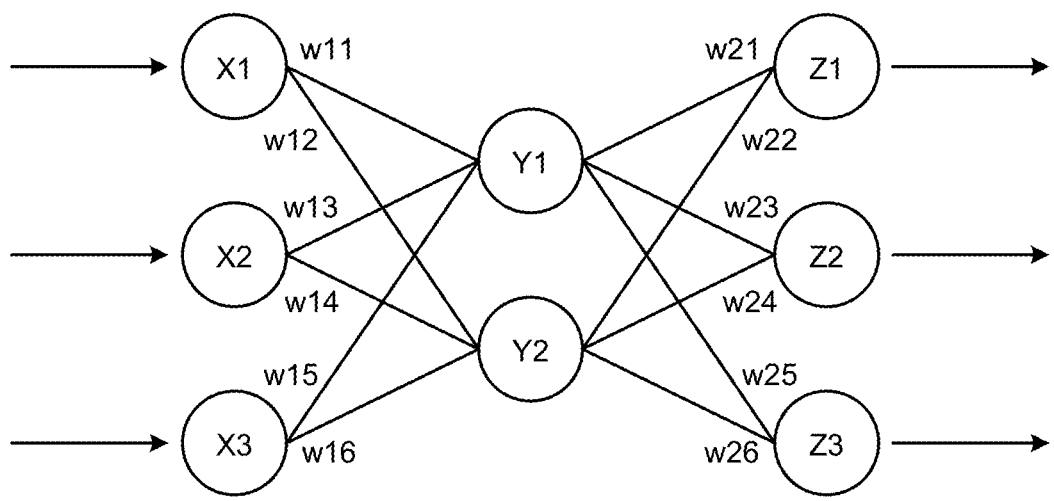
FIG. 16 is a diagram illustrating a configuration of a neural network that is used by the monitoring system according to the third embodiment.

FIG. 16 is a diagram illustrating a configuration of a neural network that is used by the monitoring system according to the third embodiment. A neural network includes an input layer composed of a plurality of neurons, an intermediate layer (hidden layer) composed of a plurality of neurons, and an output layer composed of a plurality of neurons. The number of intermediate layers may be one or two or more. The neural network illustrated in FIG. 16 is a three-layer neural network. The input layer includes neurons X1, X2, and X3. The intermediate layer includes neurons Y1 and Y2. The output layer includes neurons Z1, Z2, and Z3. Note that each layer may include any number of neurons. A plurality of values input to the input layer are multiplied by weights W1, i.e. w11, w12, w13, w14, w15, and w16, and input to the intermediate layer. A plurality of values input to the intermediate layer are multiplied by weights W2, i.e. w21, w22, w23, w24, w25, and w26, and output from the output layer. The output results output from the output layer vary according to the values of the weights W1 and W2.

In the third embodiment, the neural network imports necessity determination conditions for hierarchy information through what is called supervised learning according to a data set created based on the combination of: the information of the hierarchy information 50 observed by the state observation unit 72, including layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer; and the determination data input by the user and acquired by the data acquisition unit 71.

That is, the neural network learns by adjusting the weight W1 and the weight W2 such that outputs from the output layer in response to inputs of information of the hierarchy information 50, including layer name, data name, layer position, the number of layers under an upper layer, the number of pieces of operating state data belonging to an upper layer, the kind of layer, tag, update date, creation date, data type, data value, access right to layers, access right to data, upper layer name, the number of lower layers, and the number of pieces of operating state data belonging to a layer, to the input layer approach the determination data input by the user. As mentioned above, the determination data here means the result of a determination as to whether to import information included in the hierarchy information 50 into the large-scale hierarchy information 60.

The neural network can also import necessity determination conditions for hierarchy information through what is called unsupervised learning. Unsupervised learning is a technique for providing a large amount of input data alone to the learning unit 73 to learn how the input data are distributed and learn by performing compression, classification, shaping, or the like on the input data without corresponding training output data. In the unsupervised learning, features in a data set can be clustered by similarity, for example. In the unsupervised learning, using the result of this clustering, output allocation is performed in a manner that optimizes some criterion provided, whereby output prediction can be implemented. A type of problem setting intermediate between unsupervised learning and supervised learning is what is called semi-supervised learning. Semi-supervised learning is learning in which some data are input-output pairs and the remaining data are inputs alone.

As a learning algorithm, the learning unit 73 can also use deep learning, which learns feature extraction directly. Alternatively, the learning unit 73 may execute machine learning according to another known method, e.g. genetic programming, functional logic programming, a support vector machine, or the like.

In the third embodiment, the hierarchy information import determination unit 30 according to the second embodiment makes an import necessity determination of the hierarchy information 50 by using the learning results in the import necessity determination condition learning unit 70, instead of the designation conditions. Consequently, the third embodiment can achieve the same effect as the second embodiment without using the designation conditions.

The learning unit 73 may learn import necessity determination conditions for hierarchy information according to the data sets created for a plurality of monitoring systems. Note that the learning unit 73 may learn import necessity determination conditions for hierarchy information by acquiring data sets from a plurality of monitoring systems, or by using the data sets collected from a plurality of machine tools operating independently at different sites. Further, it is possible to add a new monitoring system to a list of monitoring systems from which data sets are collected, or to remove some monitoring system from the list. In addition, a machine learning device that has learned import necessity determination conditions for hierarchy information for some monitoring system may be attached to a different monitoring system, and the import necessity determination conditions for hierarchy information may be relearned and updated for the different monitoring system.

As described above, in the third embodiment, the hierarchy information import determination unit 30 according to the second embodiment makes an import necessity determination of the hierarchy information 50 by using the learning results in the import necessity determination condition learning unit 70, instead of the designation conditions. Consequently, the third embodiment can achieve the same effect as the second embodiment without creating the designation conditions by the user.

In addition, in the third embodiment, information to be imported into the large-scale hierarchy information 60 can be automatically selected from among the information included in the hierarchy information 50, and the large-scale hierarchy information 60 can be automatically reduced in amount. Therefore, the man-hours required of the user to create the large-scale hierarchy information 60 can be eliminated, and the man-hours required of the user to create the designation conditions can also be eliminated.

Fourth Embodiment

Figure 17:
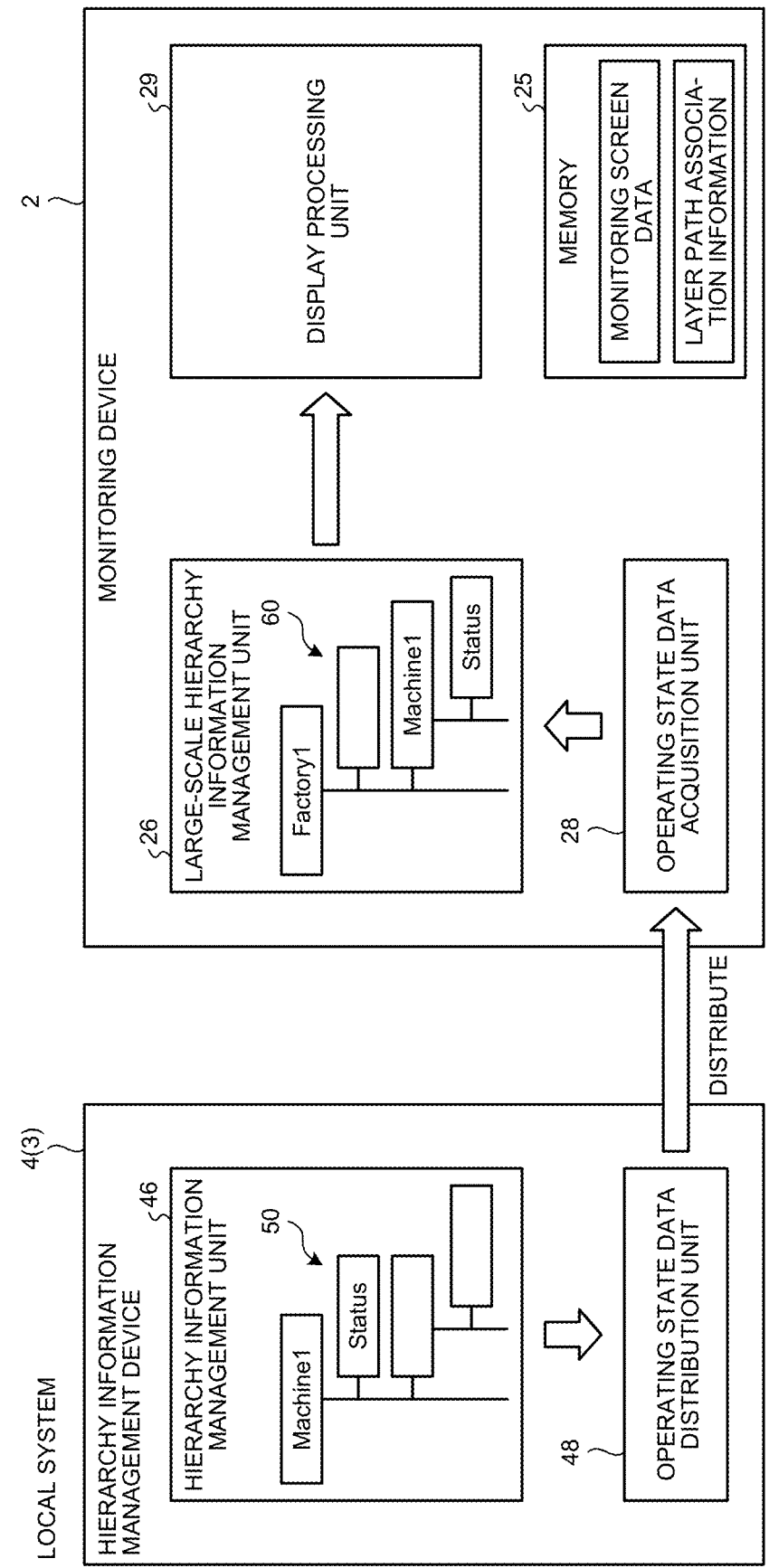
FIG. 17 is a diagram schematically illustrating a method for displaying a monitoring screen in a monitoring device of a monitoring system according to a fourth embodiment.

FIG. 17 is a diagram schematically illustrating a method for displaying a monitoring screen in a monitoring device of a monitoring system according to a fourth embodiment. Thick arrows in FIG. 17 indicate the flow of operating state data. The fourth embodiment describes a case in which the memory 25 of the monitoring device 2 includes layer path association information.

The layer path association information is information that associates the layer path of a given layer in the large-scale hierarchy information 60 with the layer path of the layer of the hierarchy information 50 of the hierarchy information management device 4 of the local system 3 corresponding to the given layer in the large-scale hierarchy information 60. In other words, the layer path association information is information that associates the layer path of a given layer in the large-scale hierarchy information 60 with the layer path of the layer in the hierarchy information 50 from which the operating state data of the given layer is acquired.

For example, consider a case in which the monitoring screen of the layer "Status" under the layer "Machine1" under the layer "Factory1" in the large-scale hierarchy information 60 illustrated in FIG. 17 is displayed on the display unit 23. The layer "Status" in the large-scale hierarchy information 60 corresponds to the layer "Status" under the layer "Machine1" in the hierarchy information 50 of the local system 3. That is, the operating state data displayed on the monitoring screen of the layer "Status" in the large-scale hierarchy information 60 is the operating state data of the layer "Status" in the hierarchy information 50 of the local system 3.

In this case, layer path association information that associates the layer path of the layer "Status" in the large-scale hierarchy information 60 with the layer path of the layer "Status" in the hierarchy information 50 of the local system 3 is stored in the memory 25 in advance. The large-scale hierarchy information management unit 26 refers to the layer path association information stored in advance in the memory 25. When generating the large-scale hierarchy information 60, the large-scale hierarchy information management unit 26 creates the layer path association information and stores the layer path association information in the memory 25. Note that the layer path association information may be stored in the large-scale hierarchy information management unit 26.

When the display processing unit 29 requests operating state data by designating the layer path of the operating state data of the read monitoring screen data in the large-scale hierarchy information 60, the large-scale hierarchy information management unit 26 converts the layer path in the large-scale hierarchy information 60 into the corresponding layer path of the layer in the hierarchy information 50 of the hierarchy information management device 4 of the local system 3 based on the layer path association information. The large-scale hierarchy information management unit 26 designates the layer path of the layer in the hierarchy information 50 obtained through conversion, and requests the operating state data from the operating state data acquisition unit 28.

Figure 18:
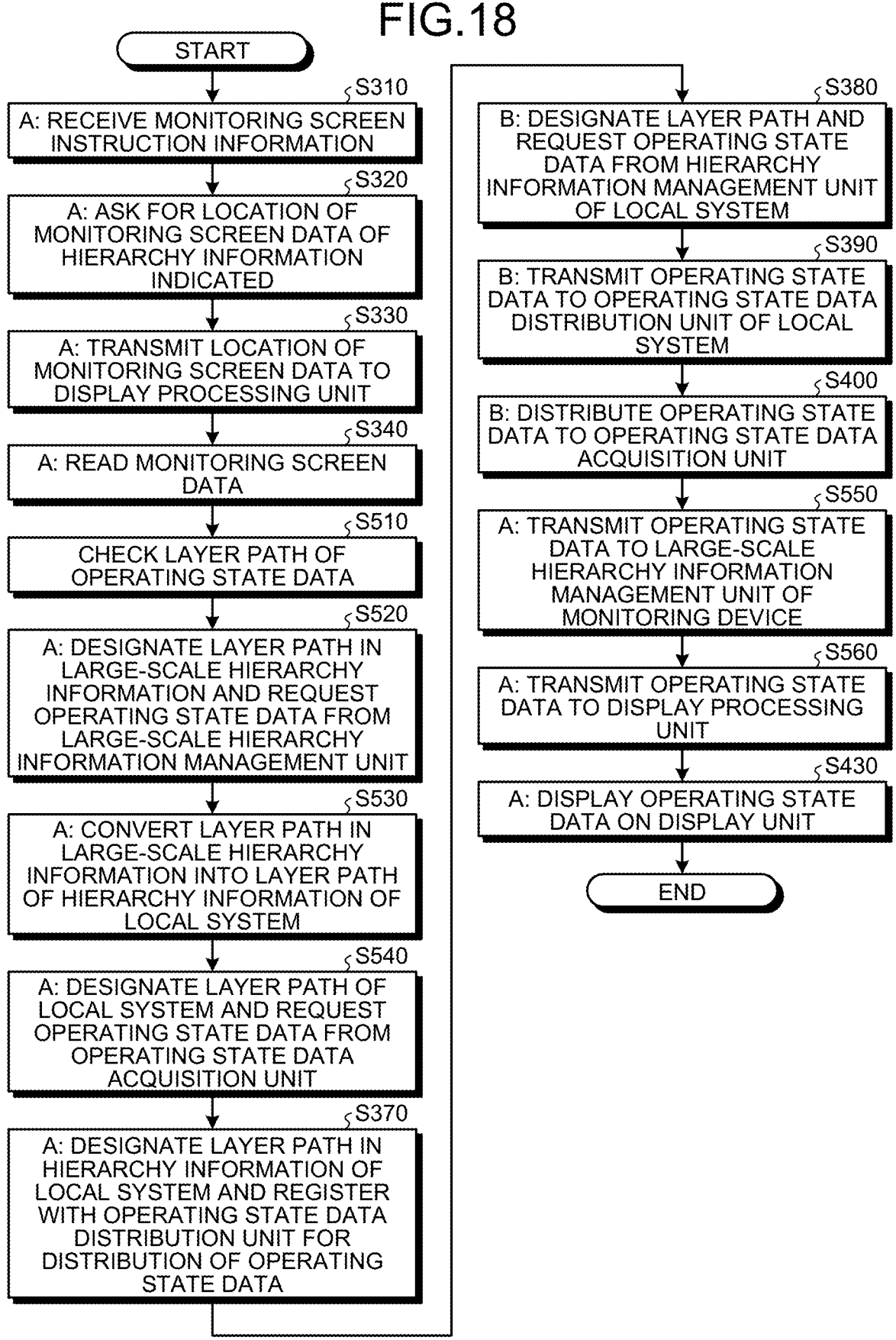
FIG. 18 is a flowchart illustrating a procedure of the method for displaying a monitoring screen in the monitoring device of the monitoring system in the fourth embodiment.

FIG. 18 is a flowchart illustrating a procedure of the method for displaying a monitoring screen in the monitoring device of the monitoring system in the fourth embodiment. Hereinafter, differences between the flowchart of FIG. 18 and the flowchart illustrated in FIG. 11 in the first embodiment will be described.

Step S340 is followed by step S510, in which the display processing unit 29 checks the layer path of the operating state data of the read monitoring screen data in the large-scale hierarchy information 60. The layer path related to the operating state data of the read monitoring screen data in the large-scale hierarchy information 60 is stored in the read monitoring screen data.

In step S520, the display processing unit 29 designates the layer path of the operating state data of the read monitoring screen data in the large-scale hierarchy information 60, and requests the operating state data from the large-scale hierarchy information management unit 26.

In step S530, the large-scale hierarchy information management unit 26 converts the layer path of the operating state data of the monitoring screen data in the large-scale hierarchy information 60 designated by the display processing unit 29 into the layer path in the hierarchy information 50 of the hierarchy information management device 4 of the local system 3 based on the layer path association information.

In step S540, the large-scale hierarchy information management unit 26 designates the layer path in the hierarchy information 50 of the hierarchy information management device 4 of the local system 3 obtained through conversion, and requests the operating state data from the operating state data acquisition unit 28.

Step S400 is followed by step S550, in which the operating state data acquisition unit 28 of the monitoring device 2 transmits the acquired operating state data to the large-scale hierarchy information management unit 26 of the monitoring device 2.

In step S560, the large-scale hierarchy information management unit 26 transmits the acquired operating state data to the display processing unit 29.

As described above, in the fourth embodiment, the large-scale hierarchy information management unit 26 of the monitoring device 2 converts a layer path in the large-scale hierarchy information 60 into the corresponding layer path of the layer in the hierarchy information 50 of the hierarchy information management device 4 of the local system 3 based on the layer path association information, designates the layer path of the layer in the hierarchy information 50 obtained through conversion, and requests the operating state data from the operating state data acquisition unit 28.

Consequently, the monitoring system 1 can easily search for and acquire the target operating state data from among a large amount of information by centrally managing, based on the large-scale hierarchy information 60, the locations of the operating state data of the hierarchy information 50 of the hierarchy information management devices 4 of a plurality of local systems 3. Consequently, the monitoring system 1 can collectively manage the locations of the operating state data, which improves the configuration and usability of software for implementing the processing of the monitoring device 2 with application software in the monitoring system 1.

Fifth Embodiment

Figure 19:
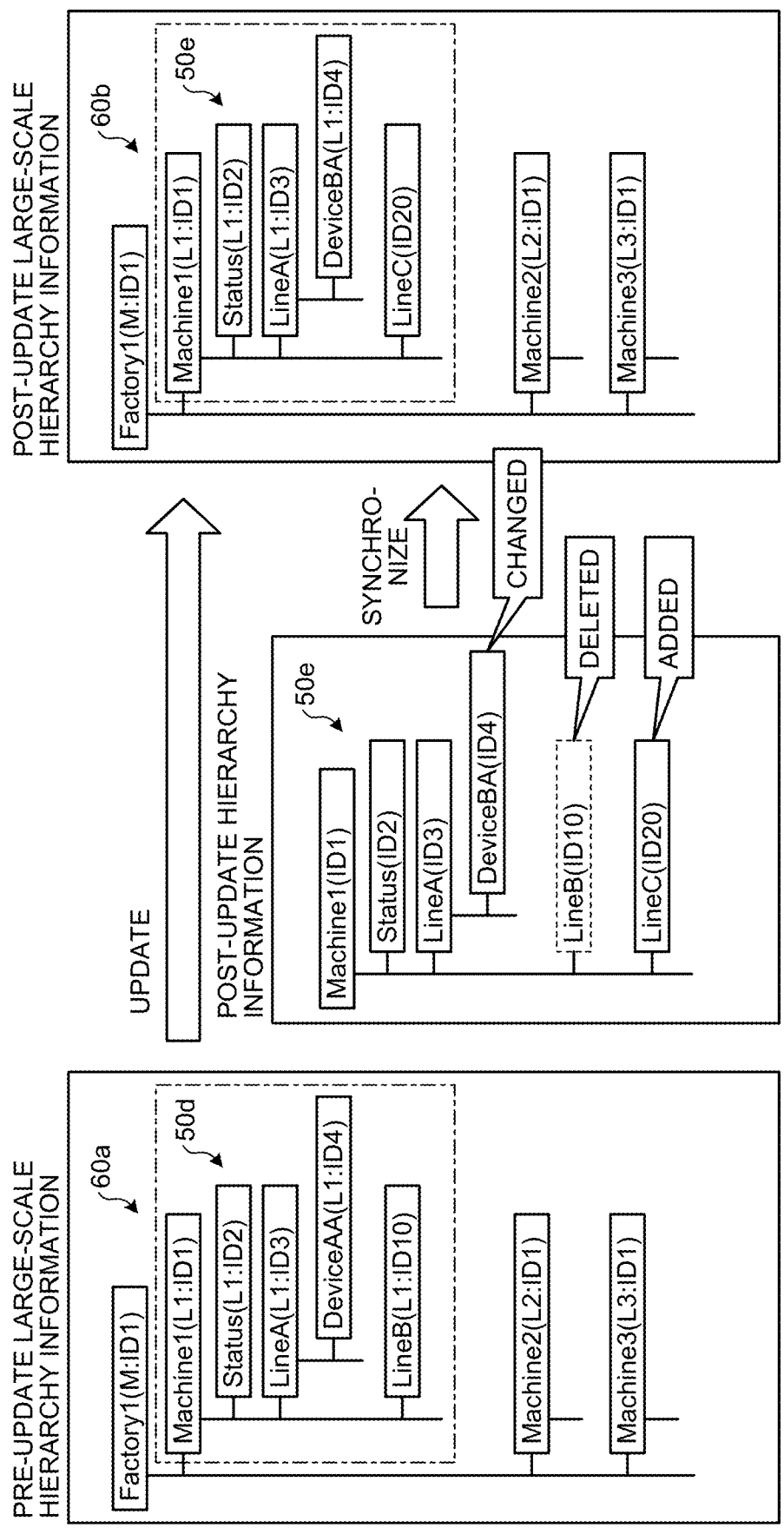
FIG. 19 is a diagram schematically illustrating a synchronization process for large-scale hierarchy information in a fifth embodiment.

A fifth embodiment describes a function in which the large-scale hierarchy information management unit 26 of the monitoring device 2 in the monitoring system 1 acquires the hierarchy information 50 of the hierarchy information management device 4 of the local system 3 at a given timing, compares the hierarchy information 50 with the large-scale hierarchy information 60 already generated, and reflects the updated content of the hierarchy information 50. FIG. 19 is a diagram schematically illustrating a synchronization process for large-scale hierarchy information in the fifth embodiment.

As illustrated in FIG. 19, the large-scale hierarchy information management unit 26 of the monitoring device 2 can acquire post-update hierarchy information 50*e* at a given timing, and update pre-update large-scale hierarchy information 60*a* to post-update large-scale hierarchy information 60*b* based on the post-update hierarchy information 50*e*. The large-scale hierarchy information management unit 26 reflects the change from pre-update hierarchy information 50*d* to the post-update hierarchy information 50*e*, which is the updated content of the post-update hierarchy information 50*e*, in the pre-update large-scale hierarchy information 60*a*, and updates the pre-update large-scale hierarchy information 60*a* to the post-update large-scale hierarchy information 60*b* with the updated content of the post-update hierarchy information 50*e*.

That is, the large-scale hierarchy information management unit 26 deletes, from the pre-update large-scale hierarchy information 60*a*, the layer deleted from the pre-update hierarchy information 50*d* in the post-update hierarchy information 50*e*. The large-scale hierarchy information management unit 26 adds, to the pre-update large-scale hierarchy information 60*a*, the layer added to the pre-update hierarchy information 50*d* in the post-update hierarchy information 50*e*. The large-scale hierarchy information management unit 26 changes, from the pre-update large-scale hierarchy information 60*a*, the layer changed from the pre-update hierarchy information 50*d* in the post-update hierarchy information 50*e*.

When adding a layer to the hierarchy information 50, the large-scale hierarchy information management unit 26 may perform the import necessity determination described in the second embodiment or the third embodiment.

In addition, each layer of the hierarchy information 50 may be assigned an unchangeable unique identification (ID). The large-scale hierarchy information management unit 26 compares the hierarchy information of the layers with the same IDs in the post-update hierarchy information 50*e* and the pre-update large-scale hierarchy information 60*a*, and updates the difference. For example, a comparison between "DeviceAA", the name of the layer ID4 of the pre-update large-scale hierarchy information 60*a*, and "DeviceBA", the name of the layer ID4 of the post-update hierarchy information 50*e*, shows the change of the name in the post-update hierarchy information 50*e*. In this case, the large-scale hierarchy information management unit 26 changes the name "DeviceAA" of the layer ID4 of the pre-update large-scale hierarchy information 60*a* to "DeviceBA", and updates the pre-update large-scale hierarchy information 60*a* to the post-update large-scale hierarchy information 60*b*.

Therefore, according to the fifth embodiment, by managing the large-scale hierarchy information 60 and the hierarchy information 50 using IDs, it is possible to easily associate a layer of the pre-update large-scale hierarchy information large 60*a* with the layer of the post-update hierarchy information 50*e* corresponding to this layer, and to easily update the large-scale hierarchy information 60.

The above-mentioned synchronization process for the large-scale hierarchy information 60 may be automatically performed by the monitoring system 1, or the synchronization process for the large-scale hierarchy information 60 may be started in response to the user inputting an instruction to synchronize the large-scale hierarchy information 60 to the monitoring system 1 at a given timing.

Figure 20:
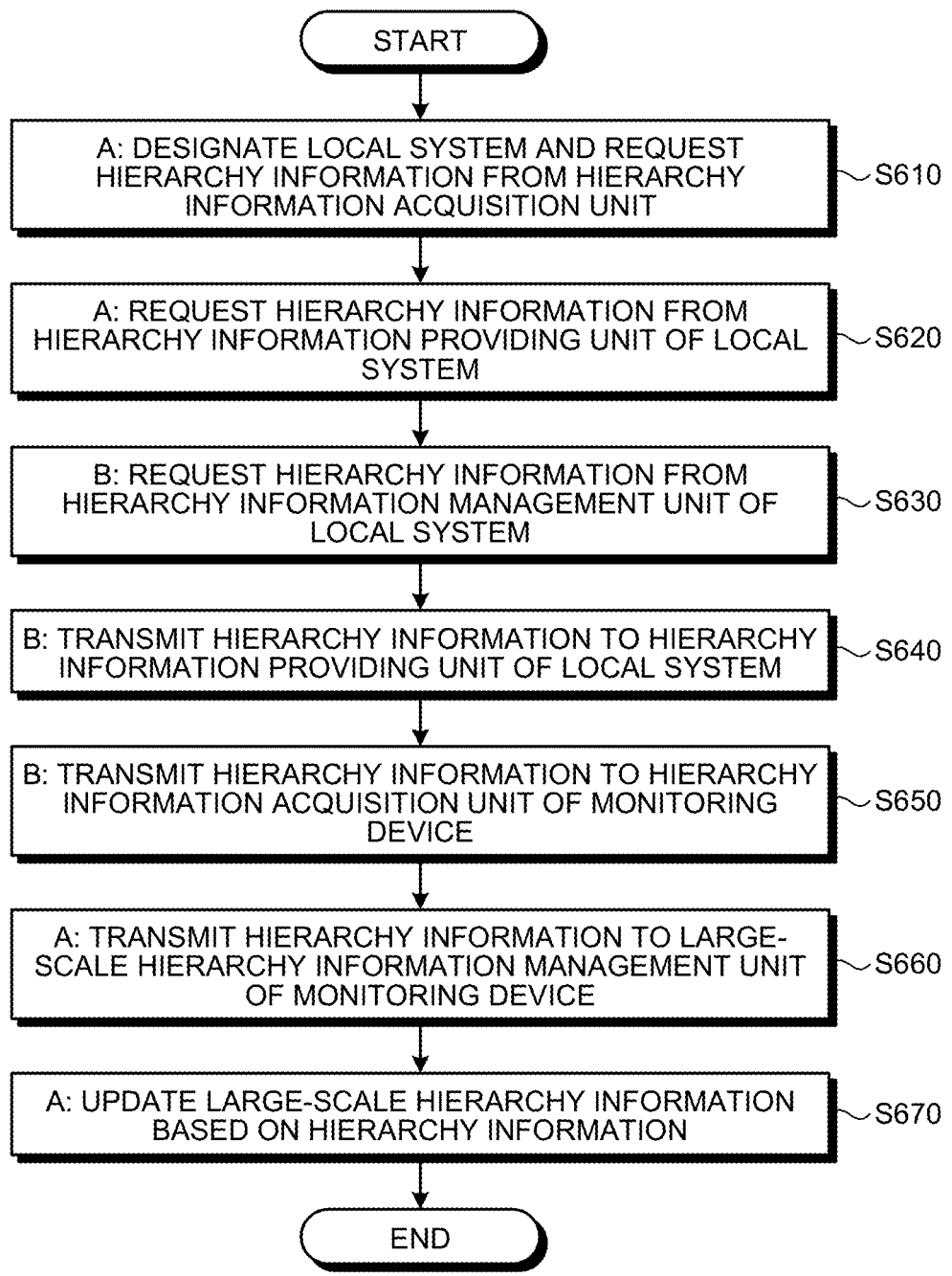
FIG. 20 is a flowchart illustrating a procedure of a method for displaying a monitoring screen in a monitoring device of a monitoring system in the fifth embodiment.

FIG. 20 is a flowchart illustrating a procedure of a method for displaying a monitoring screen in the monitoring device of the monitoring system in the fifth embodiment.

(Processing in Monitoring Device)

In step S610, the large-scale hierarchy information management unit 26 of the monitoring device 2 designates the local system 3 having the hierarchy information 50 imported in the large-scale hierarchy information 60, and requests the hierarchy information acquisition unit 27 of the monitoring device 2 to acquire hierarchy information. Specifically, the large-scale hierarchy information management unit 26 designates the hierarchy information management device 4 of the local system 3 having the hierarchy information 50 imported in the large-scale hierarchy information 60 as the acquisition source, and requests the hierarchy information acquisition unit 27 to acquire hierarchy information.

In step S620, the hierarchy information acquisition unit 27 requests the hierarchy information from the hierarchy information providing unit 47 of the hierarchy information management device 4 of the local system 3 designated as the acquisition source.

(Processing in Local System)

In step S630, the hierarchy information providing unit 47 of the hierarchy information management device 4 that has received the request for hierarchy information requests hierarchy information from the hierarchy information management unit 46 of the hierarchy information management device 4 of the local system 3.

In step S640, the hierarchy information management unit 46 transmits the hierarchy information 50 to the hierarchy information providing unit 47 of the hierarchy information management device 4 of the local system 3.

In step S650, the hierarchy information providing unit 47 converts the hierarchy information 50 acquired from the hierarchy information management unit 46 into a data format for transmission to the monitoring device 2, and transmits the resultant hierarchy information 50 to the hierarchy information acquisition unit 27 of the monitoring device 2.

(Processing in Monitoring Device)

In step S660, the hierarchy information acquisition unit 27 converts the hierarchy information 50 acquired from the hierarchy information providing unit 47 into a data format for transmission to the large-scale hierarchy information management unit 26 of the monitoring device 2, and transmits the resultant hierarchy information 50 to the large-scale hierarchy information management unit 26.

In step S670, the large-scale hierarchy information management unit 26 updates the large-scale hierarchy information 60 based on the hierarchy information 50 acquired from the hierarchy information acquisition unit 27. The updated large-scale hierarchy information 60 is stored in the memory 25. Specifically, the large-scale hierarchy information management unit 26 compares the hierarchy information 50 acquired from the hierarchy information acquisition unit 27 with the large-scale hierarchy information 60 already generated, and reflects the updated content of the hierarchy information 50 in the large-scale hierarchy information 60 to update the large-scale hierarchy information 60.

As described above, in the fifth embodiment, the large-scale hierarchy information management unit 26 of the monitoring device 2 reacquires the hierarchy information 50 from the hierarchy information management device 4 of the local system 3 having the hierarchy information 50 imported in the large-scale hierarchy information 60. Then, the large-scale hierarchy information management unit 26 compares the reacquired hierarchy information 50 with the large-scale hierarchy information 60 already generated, and reflects the updated content of the hierarchy information 50 in the large-scale hierarchy information 60 to update the large-scale hierarchy information 60. That is, the large-scale hierarchy information management unit 26 updates the large-scale hierarchy information 60 based on the difference between the reacquired hierarchy information 50 and the large-scale hierarchy information 60 already generated.

Therefore, in the fifth embodiment, the change in the hierarchy information 50 in the local system 3 can be automatically reflected in the large-scale hierarchy information 60 in the monitoring device 2. Consequently, in the fifth embodiment, it is possible to automatically synchronize the multiple pieces of hierarchy information 50 imported in the large-scale hierarchy information 60 with the large-scale hierarchy information 60. In addition, in the fifth embodiment, it is possible to reduce the worker's trouble of reflecting the change in the hierarchy information 50 in the large-scale hierarchy information 60, and thus it is possible to reduce the man-hours and maintenance costs related to the maintenance of the large-scale hierarchy information 60.

Sixth Embodiment

A sixth embodiment describes a case in which the display processing unit 29 of the monitoring device 2 in the monitoring system 1 has a function of converting a given layer path in the large-scale hierarchy information 60 into a layer path in the hierarchy information 50 of the hierarchy information management device 4 of the local system 3 using a relative path and a screen call position. In order to acquire the operating state data to be displayed on the monitoring screen, the monitoring device 2 can use a monitoring screen template described using a relative path, instead of the layer path of the large-scale hierarchy information 60. The relative path is position information obtained by generalizing information indicating a route in the large-scale hierarchy information 60 from a given layer to another given layer in the large-scale hierarchy information 60. For example, the relative path is exemplified by a relative path describing that the layer "Status" is placed below the layer "Machine1".

The monitoring screen template is generalized monitoring screen data. That is, the monitoring screens of layers that have the same configuration can be displayed by using one piece of generalized monitoring screen data. The monitoring screen template described using a relative path is monitoring screen data described with a relative path added thereto. By using the monitoring screen template described using a relative path, one monitoring screen template can be applied to monitoring screen data of a plurality of layers that are located at different layer positions in the large-scale hierarchy information 60 and have the same layer configuration. The monitoring screen template described using a relative path is added to the hierarchy information 50 when the large-scale hierarchy information management unit 26 of the monitoring device 2 generates the large-scale hierarchy information 60.

Figure 21:
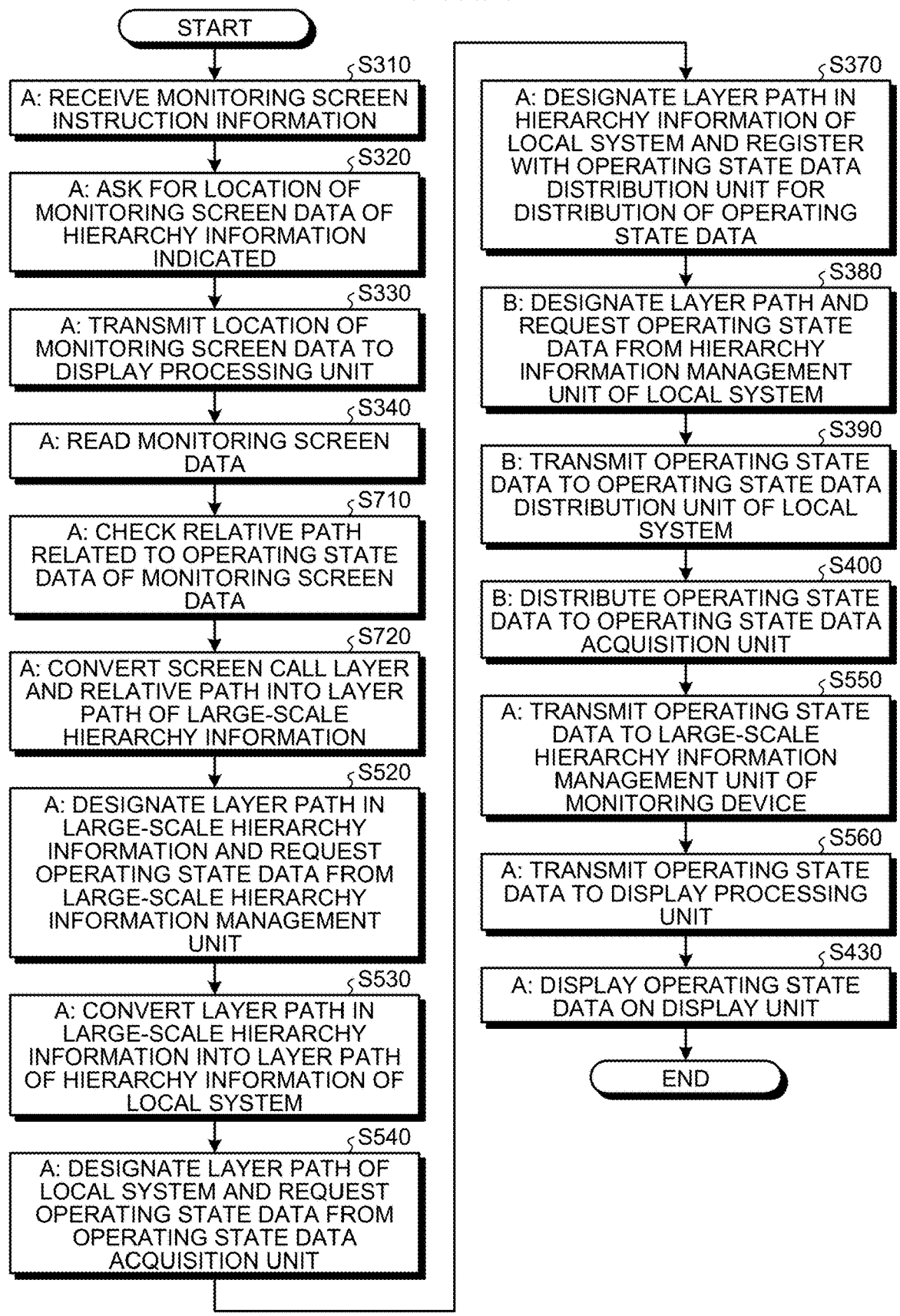
FIG. 21 is a flowchart illustrating a procedure of a method for displaying a monitoring screen of a monitoring system in a sixth embodiment.

FIG. 21 is a flowchart illustrating a procedure of a method for displaying a monitoring screen of the monitoring system in the sixth embodiment. Hereinafter, differences between the flowchart of FIG. 21 and the flowchart illustrated in FIG. 18 in the fourth embodiment will be described.

Step S340 is followed by step S710, in which the display processing unit 29 checks the relative path related to the operating state data of the read monitoring screen data. The relative path is stored in the hierarchy information 50 in association with the hierarchy information of the read monitoring screen data indicated by the monitoring screen instruction information.

In step S720, the display processing unit 29 converts the screen call layer and the relative path into the layer path of the large-scale hierarchy information 60 of the monitoring device 2 of the monitoring system 1. For example, suppose that the layer of the read monitoring screen data is the layer "Factory" in the large-scale hierarchy information 60, and a relative path describing that the layer "Status" is placed below the layer "Machine1" is stored in association with this monitoring screen data. In this case, the display processing unit 29 can identify the layer path indicated by the screen call layer and the relative path in the large-scale hierarchy information 60 as indicating that the layer "Machine1" is below the "Factory" and the layer below the layer "Machine1" is "Status". For example, consider a case in which the layer of the read monitoring screen data is the layer "Factory" in the large-scale hierarchy information 60, and the relative path for acquiring the operating state data in the screen of the layer "Factory" is the relative path "Machine1-Status". The relative path "Machine1-Status" indicates a relative path describing that the layer "Status" is below the layer "Machine1". In this case, the display processing unit 29 converts the screen call layer and the relative path into the layer path "Factory-Machine1-Status" of the large-scale hierarchy information 60. The layer path "Factory-Machine1-Status" indicates a layer path describing that the layer "Machine1" is below the layer "Factory" and the layer "Status" is below the layer "Machine1". Then, the display processing unit 29 designates the layer path "Factory-Machine1-Status" of the large-scale hierarchy information 60 in the large-scale hierarchy information management unit 26 to acquire the operating state data.

As described above, in the large-scale hierarchy information 60 in the sixth embodiment, it is possible to apply one monitoring screen template described using a relative path to monitoring screen data of a plurality of layers that are located at different layer positions in the large-scale hierarchy information 60 but have the same layer configuration. Consequently, the reusability of monitoring screen data can be enhanced, and the man-hours for creating monitoring screen data can be reduced.

Seventh Embodiment

Figure 22:
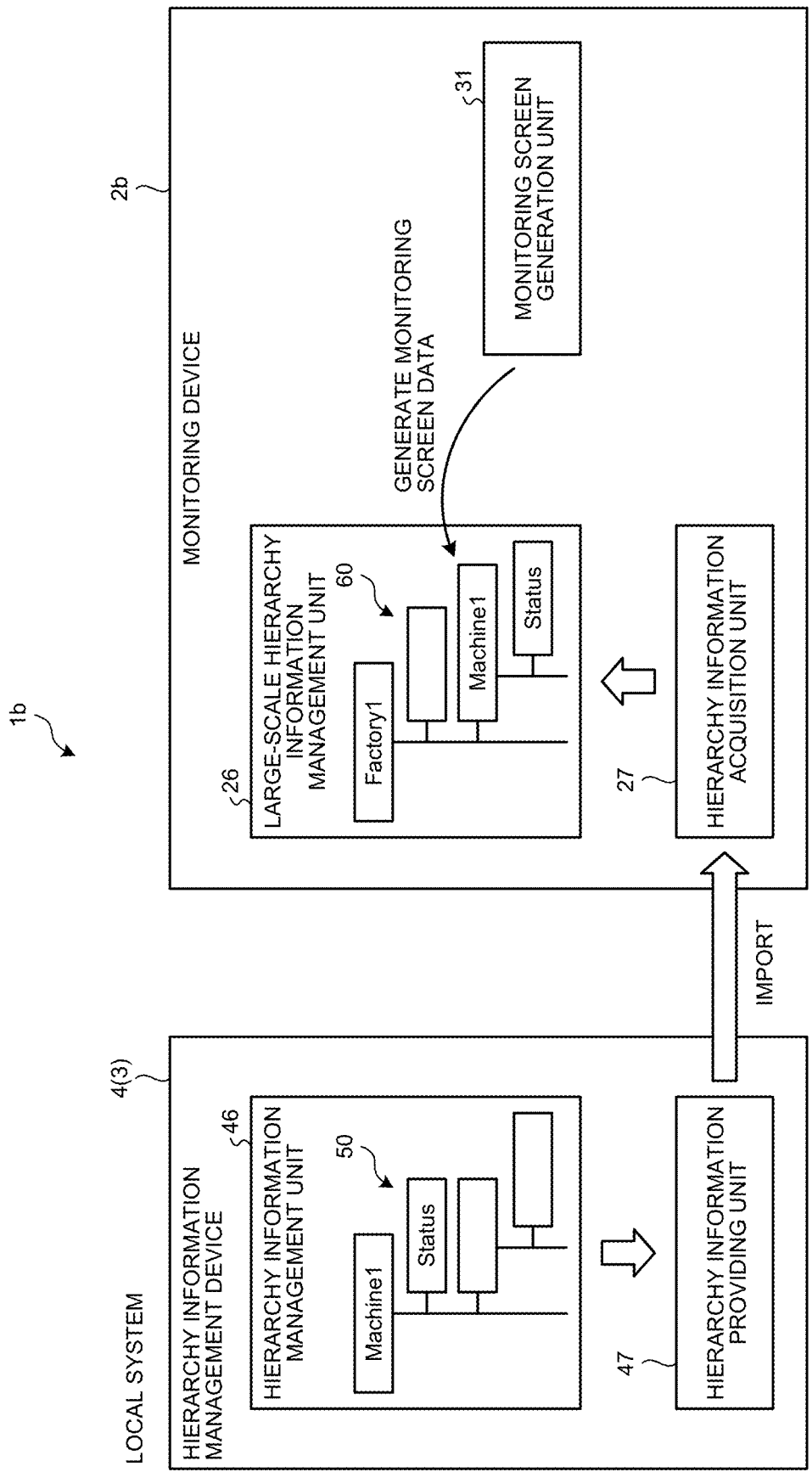
FIG. 22 is a diagram schematically illustrating a method for displaying a monitoring screen in a monitoring device of a monitoring system in a seventh embodiment.

FIG. 22 is a diagram schematically illustrating a method for generating large-scale hierarchy information in a monitoring system according to a seventh embodiment. Thick arrows in FIG. 22 indicate the flow of operating state data. A monitoring system 1b according to the seventh embodiment includes a monitoring device 2b formed by adding a monitoring screen generation unit 31 to the monitoring device 2 according to the first embodiment.

The monitoring screen generation unit 31 generates monitoring screen data based on an operating state data list.

The operating state data list is a list of names and layer paths of the operating state data belonging to the respective layers of the large-scale hierarchy information 60. As in the case of the monitoring system 1 according to the first embodiment, operating state data is acquired from the hierarchy information management device 4 of the local system 3 through the large-scale hierarchy information management unit 26 of the monitoring device 2b.

In the monitoring system 1b, information on the monitoring screen data generated by the monitoring screen generation unit 31 can be added to the large-scale hierarchy information 60, instead of the information on monitoring screen data that is added in step S190 described above by the large-scale hierarchy information management unit 26 to the large-scale hierarchy information 60 according to monitoring screen data addition information.

Figure 23:
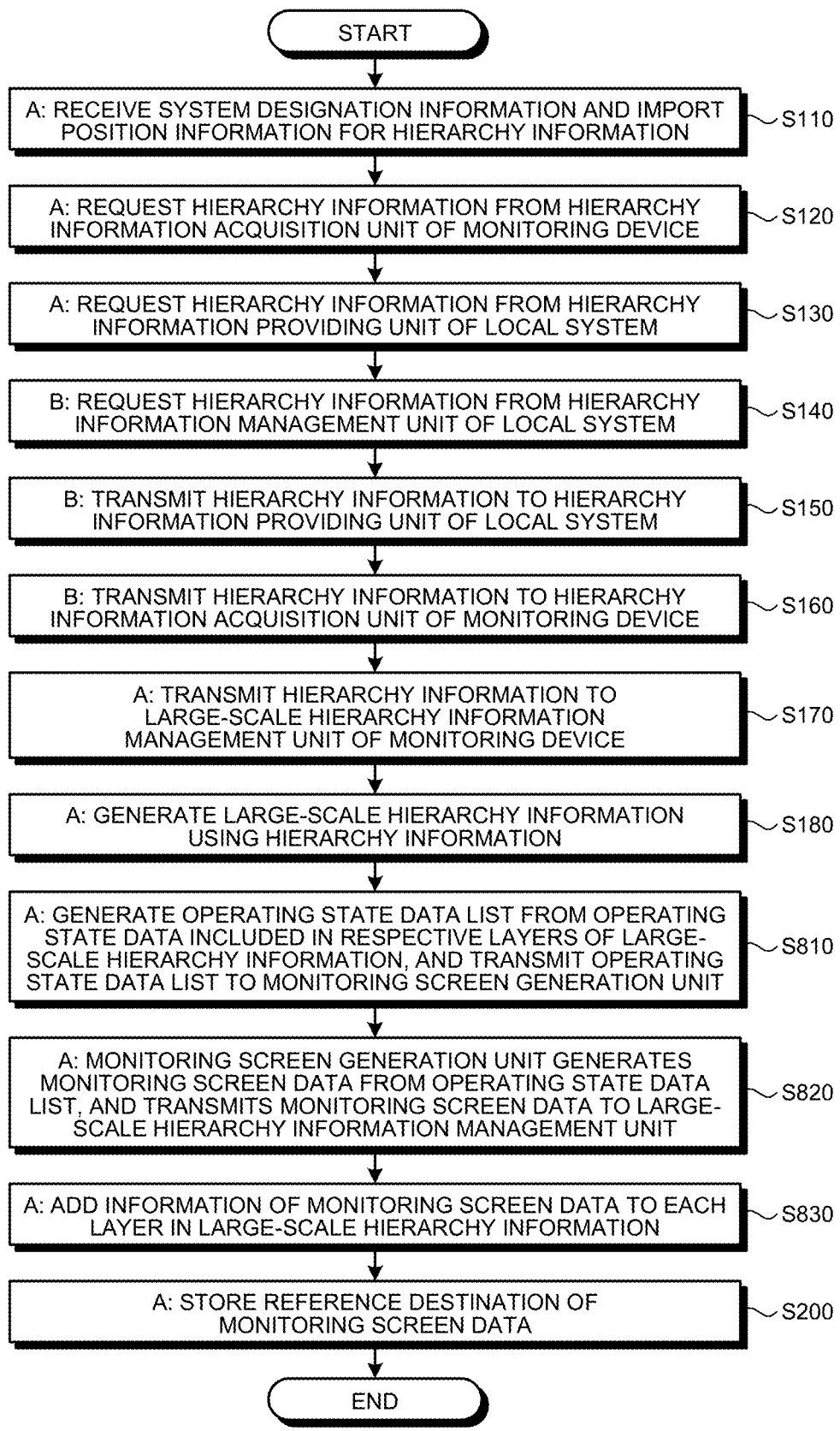
FIG. 23 is a flowchart illustrating a procedure of a method for generating large-scale hierarchy information in the monitoring system according to the seventh embodiment.

FIG. 23 is a flowchart illustrating a procedure of the method for generating large-scale hierarchy information in the monitoring system according to the seventh embodiment. Hereinafter, differences between the flowchart of FIG. 23 and the flowchart illustrated in FIG. 9 in the first embodiment will be described.

(Processing in Monitoring Device)

Step S180 is followed by step S810, in which the large-scale hierarchy information management unit 26 of the monitoring device 2b generates an operating state data list from the operating state data included in the respective layers of the large-scale hierarchy information 60, and transmits the operating state data list to the monitoring screen generation unit 31. The operating state data list is generated by the large-scale hierarchy information management unit 26 extracting the names and layer paths of the operating state data included in the respective layers of the large-scale hierarchy information 60.

In step S820, the monitoring screen generation unit 31 generates monitoring screen data from the operating state data list, and transmits the generated monitoring screen data to the large-scale hierarchy information management unit 26. Here, the monitoring screen data is monitoring screen data for displaying the names of the operating state data and the values acquired by the layer paths in list form.

In step S830, the large-scale hierarchy information management unit 26 automatically adds the information on the monitoring screen data acquired from the monitoring screen generation unit 31 to each layer in the large-scale hierarchy information 60. In addition, the large-scale hierarchy information management unit 26 stores the monitoring screen data acquired from the monitoring screen generation unit 31 in the memory 25. Then, the large-scale hierarchy information management unit 26 stores information on an area of the memory 25 to which the display processing unit 29 refers when acquiring the monitoring screen data (reference destination of the monitoring screen data).

As described above, in the monitoring system 1b according to the seventh embodiment, monitoring screen data is automatically created by the monitoring screen generation unit 31 of the monitoring device 2b, and thus the man-hours and load required of the user can be further reduced.

Eighth Embodiment

An eighth embodiment describes a modification of the monitoring system 1b discussed in the seventh embodiment. In the monitoring system 1b discussed in the seventh embodiment, the data name, layer position, tag, update date, creation date, data type, data value, access right to data, and upper layer name of the hierarchy information 50 acquired based on the operating state data list are set as designation conditions. In addition, screen components for displaying the operating state data on the monitoring screen are set in correspondence with the designation conditions, namely the data name, layer position, tag, update date, creation date, data type, data value, access right to data, and upper layer name of the hierarchy information 50. Access right includes access right for reading the hierarchy information 50 and access right for writing to the hierarchy information 50.

The designation conditions and the screen components for displaying the operating state data on the monitoring screen in correspondence with the designated conditions are determined in advance and stored in the memory 25. Note that the designation conditions and the screen components for displaying the operating state data on the monitoring screen in correspondence with the designation conditions may be stored in the monitoring screen generation unit 31.

The monitoring screen generation unit 31 selects screen components matching the designation conditions for each piece of operating state data in the acquired operating state data list. The monitoring screen generation unit 31 adds the data name and the layer path to the selected screen components, and arranges the screen components in the monitoring screen data. The monitoring screen generation unit 31 adds this monitoring screen data to the large-scale hierarchy information 60. Consequently, the screen components can be arranged on the monitoring screen based on the operating state data list.

FIG. 24 is a flowchart illustrating a procedure of a method for generating large-scale hierarchy information in the monitoring system according to the eighth embodiment. Hereinafter, differences between the flowchart of FIG. 24 and the flowchart illustrated in FIG. 23 in the seventh embodiment will be described.

(Processing in Monitoring Device)

Step S810 is followed by step S910, in which the monitoring screen generation unit 31 of the monitoring device 2b generates monitoring screen data from the acquired operating state data list, and transmits the generated monitoring screen data to the large-scale hierarchy information management unit 26. Here, the monitoring screen generation unit 31 selects screen components for displaying the operating state data on the monitoring screen from a screen component list based on the designation conditions, and arranges the selected screen components on the monitoring screen to generate monitoring screen data. The screen component list is a list of screen components for displaying the operating state data on the monitoring screen, and is stored in advance in the monitoring screen generation unit 31 as a library.

As described above, in the eighth embodiment, in a case where monitoring screen data is automatically created by the monitoring screen generation unit 31 of the monitoring device 2b, screen components for displaying the operating state data on the monitoring screen are selected from the screen component list based on the designation conditions, and the selected screen components are arranged on the monitoring screen to generate monitoring screen data. Consequently, convenient monitoring screens can be automatically generated, and the man-hours and load required of the user can be further reduced.

Ninth Embodiment

The monitoring screen generation unit 31 in the eighth embodiment described above can be configured to automatically generate monitoring screen data using the machine learning device in the third embodiment, instead of the designation conditions. The machine learning device in a ninth embodiment is a machine learning device that learns a screen component selection method for automatically selecting the screen components to be arranged on the monitoring screen when creating the monitoring screen data of the monitoring system 1b. That is, the machine learning device in the ninth embodiment is a machine learning device that learns the screen component selection method for automatically selecting screen components for use in monitoring screen data.

In this case, in the machine learning device, input data is the data name, layer position, tag, update date, creation date, data type, data value, access right to data, and upper layer name of the hierarchy information 50. Training data is the screen component types selected by the user. Learning content is the screen component selection method. Access right includes access right for reading the hierarchy information 50 and access right for writing to the hierarchy information 50.

By providing this machine learning device in the monitoring system 1b, it is possible to automatically generate convenient monitoring screens without designating designation conditions, and it is possible to further reduce the man-hours and load required of the user. Further, the machine learning device may exist on a server on a network to which the monitoring system is connected.

The configurations described in the above-mentioned embodiments indicate examples of the contents of the present invention. The techniques of the embodiments can be combined with each other and with another well-known technique, and some of the configurations can be omitted or changed in a range not departing from the gist of the present invention.

REFERENCE SIGNS LIST

1, 1a, 1b monitoring system; 2, 2a, 2b monitoring device; 3 local system; 3a first local system; 3b second local system; 3c third local system; 4 hierarchy information management device; 4a first hierarchy information management device; 4b second hierarchy information management device; 4c third hierarchy information management device; 5 control instrument; 5a, 5aa, 5ab, 5ac first control instrument; 5b, 5ba, 5bb, 5bc second control instrument; 5c, 5ca, 5cb, 5cc third control instrument; 21, 41 input unit; 22 monitoring communication unit; 23, 43 display unit; 24, 44 processor; 25, 45 memory; 26 large-scale hierarchy information management unit; 27 hierarchy information acquisition unit; 28 operating state data acquisition unit; 29, 49 display processing unit; 30 hierarchy information import determination unit; 31 monitoring screen generation unit; 42 management communication unit; 46 hierarchy information management unit; 47 hierarchy information providing unit; 48 operating state data distribution unit; 50, 50a, 50b, 50c hierarchy information; 50d pre-update hierarchy information; 50e post-update hierarchy information; 60 large-scale hierarchy information; 60a pre-update large-scale hierarchy information; 60b post-update large-scale hierarchy information; 70 import necessity determination condition learning unit; 71 data acquisition unit; 72 state observation unit; 73 learning unit; 231 menu display; 232 screen display.

The invention claimed is:

1. A monitoring system comprising a plurality of hierarchy information management devices and a monitoring device, the monitoring system monitoring an operating state of a plurality of instruments that are monitoring targets, wherein the plurality of hierarchy information management devices include first hierarchy information management circuitry to manage first hierarchy information that is information in which information on the instruments is represented in a hierarchy structure, each of the plurality of hierarchy information management devices manages the first hierarchy information of a different one of the instruments, and the monitoring device includes:

second hierarchy information management circuitry to generate second hierarchy information based on a plurality of different pieces of the first hierarchy information acquired from the plurality of hierarchy information management devices, the second hierarchy information being hierarchy information in which the first hierarchy information is connected in a hierarchy structure;

a display to display information; and display processing circuitry to perform a process of switching between a plurality of different monitoring screens for display on the display, the plurality of different monitoring screens corresponding to different layers in the second hierarchy information and showing the operating state of the monitoring targets.

2. The monitoring system according to claim 1, wherein the second hierarchy information management circuitry adds information on monitoring screen data to each layer of the second hierarchy information, the monitoring screen data being data for displaying the monitoring screen for the instrument corresponding to each layer of the second hierarchy information.

3. The monitoring system according to claim 2, wherein the display processing circuitry causes the display to display the monitoring screen by using the monitoring screen data indicated by the information on the monitoring screen data added to each layer of the second hierarchy information.

4. The monitoring system according to claim 1, wherein the first hierarchy information management circuitry transmits operating state data to the second hierarchy information management circuitry of the monitoring device, the operating state data being data indicating the operating state of the instrument corresponding to a layer path in the first hierarchy information designated by the monitoring device.

5. The monitoring system according to claim 4, wherein the first hierarchy information management circuitry transmits the operating state data to the second hierarchy information management circuitry of the monitoring device every time the operating state data is updated.

6. The monitoring system according to claim 1, comprising
hierarchy information import determination circuitry to perform a hierarchy information import determination of comparing designation conditions with a new piece of the first hierarchy information acquired from the hierarchy information management device, and identifying information that needs to be imported into the second hierarchy information among information included in the new piece of the first hierarchy information, the designation conditions being designated information of the first hierarchy information including layer name, data name, layer position, number of layers under an upper layer, number of pieces of operating state data belonging to an upper layer, kind of layer, tag, update date, creation date, data type, data value, access right to layers, access right to data, upper layer name, number of lower layers, and number of pieces of operating state data belonging to a layer, wherein
the second hierarchy information management circuitry generates or updates the second hierarchy information by importing a part of the information included in the new piece of the first hierarchy information into the second hierarchy information based on a determination result from the hierarchy information import determination circuitry.

7. The monitoring system according to claim 6, comprising
a machine learning device to learn determination conditions that are criteria for determining whether the information included in the new piece of the first hierarchy information needs to be imported into the second hierarchy information, the machine learning device including:
state observation circuitry to observe state variables including information of the first hierarchy information including layer name, data name, layer position, number of layers under an upper layer, number of pieces of operating state data belonging to an upper layer, kind of layer, tag, update date, creation date, data type, data value, access right to layers, access right to data, upper layer name, number of lower layers, and number of pieces of operating state data belonging to a layer;
data acquisition circuitry to acquire a result indicating whether the information included in the first hierarchy information needs to be imported into the second hierarchy information, the result being input by a user; and
learning circuitry to learn the determination conditions according to a data set created based on a combination of the state variables and the result, wherein
the hierarchy information import determination circuitry compares the determination conditions with a new piece of the first hierarchy information acquired from the hierarchy information management device, and identifies information that needs to be imported into the second hierarchy information among information included in the new piece of the first hierarchy information.

8. The monitoring system according to claim 4, wherein the second hierarchy information management circuitry converts a layer path of a layer of the second hierarchy information into a layer path of a layer of the first hierarchy information based on layer path association information that is information that associates a layer path of a given layer of the second hierarchy information with a layer path of a layer of the first hierarchy information corresponding to the given layer of the second hierarchy information, designates the layer path of the layer of the first hierarchy information obtained through conversion, and requests the operating state data from the hierarchy information management device.

9. The monitoring system according to claim 1, wherein the first hierarchy information imported in the second hierarchy information is reacquired, and the second hierarchy information is updated based on a difference between the first hierarchy information reacquired and the second hierarchy information.

10. The monitoring system according to claim 1, wherein monitoring screen data that is data for displaying the monitoring screens is created using a relative path that is position information obtained by generalizing information indicating a route from a given layer in the second hierarchy information to another given layer in the second hierarchy information, and
the display processing circuitry acquires information on a layer path in the first hierarchy information based on a layer of read monitoring screen data and the relative path.

11. The monitoring system according to claim 1, comprising
monitoring screen generation circuitry to generate monitoring screen data that is data for displaying the monitoring screen from an operating state data list in which names and layer paths of operating state data of the instruments corresponding to layers of the first hierarchy information included in the second hierarchy information are described in list form.

12. The monitoring system according to claim 1, comprising
monitoring screen generation circuitry to generate monitoring screen data for displaying the monitoring screen by: setting, as designation conditions, information of the first hierarchy information including data name, layer position, tag, update date, creation date, data type, data value, access right to data, and upper layer name; automatically selecting screen components for displaying the operating state data of the instruments based on the designation conditions; and arranging the screen components on the monitoring screen.

13. The monitoring system according to claim 12, comprising
a machine learning device to learn a screen component selection method for selecting screen components for use in the monitoring screen data, the machine learning device including:
state observation circuitry to observe state variables including information of the first hierarchy information including data name, layer position, tag, update date, creation date, data type, data value, access right to data, and upper layer name;
data acquisition circuitry to acquire a screen component type selected by a user; and
learning circuitry to learn the screen component selection method according to a data set created based on a combination of the state variables and the screen component type selected by the user, wherein
the monitoring screen generation circuitry generates the monitoring screen data by automatically selecting the screen components based on the screen component selection method and arranging the screen components on the monitoring screen.

14. The monitoring system according to claim 1, wherein the instruments are production devices and/or facility devices.

15. A monitoring method for monitoring an operating state of a plurality of instruments that are monitoring targets in a monitoring system including a plurality of hierarchy information management devices and a monitoring device, the monitoring method comprising:
transmitting first hierarchy information to the monitoring device, the first hierarchy information being information in which information on the instruments is represented in a hierarchy structure;
generating second hierarchy information based on a plurality of different pieces of the first hierarchy information acquired from the plurality of hierarchy information management devices, the second hierarchy information being hierarchy information in which the first hierarchy information is connected in a hierarchy structure; and
switching between a plurality of different monitoring screens for display on a display, the plurality of different monitoring screens corresponding to different layers in the second hierarchy information and showing the operating state of the monitoring targets.

16. A non-transitory storage medium storing a program for controlling a monitoring device of a monitoring system comprising a plurality of hierarchy information management devices and the monitoring device and monitoring an operating state of a plurality of instruments that are monitoring targets, wherein
the plurality of hierarchy information management devices transmit first hierarchy information to the monitoring device, the first hierarchy information being information in which information on the instruments is represented in a hierarchy structure, and
the program causes the monitoring device to perform:
generating second hierarchy information based on a plurality of different pieces of the first hierarchy information acquired from the plurality of hierarchy information management devices, the second hierarchy information being hierarchy information in which the first hierarchy information is connected in a hierarchy structure; and
switching between a plurality of different monitoring screens for display on a display, the plurality of different monitoring screens corresponding to different layers in the second hierarchy information and showing the operating state of the monitoring targets.

\* \* \* \* \*